(12) United States Patent
Iyoda et al.

(10) Patent No.: US 10,853,423 B2
(45) Date of Patent: Dec. 1, 2020

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventors: Tetsuo Iyoda, Kanagawa (JP); Shigeki Kamiya, Tokyo (JP)

(73) Assignee: FUJI XEROX CO., LTD., Tokyo (JP)

( * ) Notice: Subject to any disclaimer, the term of this patent is extended or adjusted under 35 U.S.C. 154(b) by 232 days.

(21) Appl. No.: 15/687,946

(22) Filed: Aug. 28, 2017

(65) Prior Publication Data

US 2018/0267965 A1    Sep. 20, 2018

(30) Foreign Application Priority Data

Mar. 17, 2017 (JP) ................. 2017-052851

(51) Int. Cl.
*G06F 16/93* (2019.01)
*G06F 21/62* (2013.01)
(Continued)

(52) U.S. Cl.
CPC ........ *G06F 16/93* (2019.01); *G06F 16/90335* (2019.01); *G06F 21/41* (2013.01);
(Continued)

(58) Field of Classification Search
CPC .... G06F 16/93; G06F 16/90335; G06F 21/41; G06F 21/6209; G06F 21/602;
(Continued)

(56) References Cited

U.S. PATENT DOCUMENTS 5,509,074 A     4/1996  Choudhury et al.
9,559,889 B1 *  1/2017  Vincent ............ H04L 29/08522
(Continued)

FOREIGN PATENT DOCUMENTS

JP     S63-240677 A    10/1988
JP     H07-239828 A     9/1995
(Continued)

OTHER PUBLICATIONS

Margaret Rouse, "metadata", Retrieved from the internet: https://whatis.techtarget.com/definition/metadata, Jul. 2014. (Year: 2014).*
(Continued)

*Primary Examiner* — Robert W Beausoliel, Jr.
*Assistant Examiner* — Mohammad Solaiman Bhuyan
(74) *Attorney, Agent, or Firm* — Oliff PLC

(57) ABSTRACT

An information processing apparatus includes an acceptance unit, a first search unit, and a second search unit. The acceptance unit accepts a search condition for attribute information of a subject. The first search unit searches for subject identification information corresponding to attribute information satisfying the search condition from a first management device that manages subject identification information identifying subjects and attribute information of the subjects in association with each other. The second search unit searches for data associated with the subject identification information found by the first search unit from a second management device that manages data and subject identification information identifying subjects related to the data in association with each other.

13 Claims, 21 Drawing Sheets

(51) Int. Cl.
  *G06F 21/41* (2013.01)
  *G06F 16/903* (2019.01)
  *G06F 21/60* (2013.01)
  *H04L 29/06* (2006.01)
  *H04L 29/08* (2006.01)

(52) U.S. Cl.
  CPC ........ *G06F 21/602* (2013.01); *G06F 21/6209* (2013.01); *H04L 63/0428* (2013.01); *H04L 63/0464* (2013.01); *H04L 63/0823* (2013.01); *H04L 63/1433* (2013.01); *H04L 67/1097* (2013.01)

(58) Field of Classification Search
  CPC ............. H04L 63/0428; H04L 63/0823; H04L 63/0464; H04L 63/1433; H04L 67/1097
  See application file for complete search history.

(56) References Cited

U.S. PATENT DOCUMENTS

| | | | | |
|---|---|---|---|---|
| 2004/0267721 | A1* | 12/2004 | Meyerzon | G06F 16/10 |
| 2008/0228771 | A1* | 9/2008 | Prahlad | G06F 16/93 |
| 2011/0088025 | A1* | 4/2011 | Basmov | G06F 8/61 |
| | | | | 717/170 |
| 2016/0357971 | A1* | 12/2016 | Sinha | G06F 21/602 |
| 2017/0235726 | A1* | 8/2017 | Wang | G06Q 30/0201 |
| | | | | 707/730 |
| 2017/0235835 | A1* | 8/2017 | Wang | G06Q 50/01 |
| | | | | 707/706 |

FOREIGN PATENT DOCUMENTS

| | | | |
|---|---|---|---|
| JP | 2006-099714 | A | 4/2006 |
| JP | 2006-139682 | A | 6/2006 |
| JP | 2011-232865 | A | 11/2011 |
| JP | 2014-179000 | A | 9/2014 |
| JP | 2015-093394 | A | 5/2015 |

OTHER PUBLICATIONS

Jul. 30, 2019 Office Action issued in Japanese Patent Application No. 2017-052851.

May 14, 2019 Office Action issued in Japanese Patent Application No. 2017-052851.

\* cited by examiner

FIG. 9 eDoc DISTRIBUTION — 400

DESTINATION USER
- User0001 — 402
  - User0001
  - User0003
- ADD
- DELETE
— 404

DESTINATION TERMINAL
- Viewer001 — 406
  - Viewer001
  - Viewer004
- ADD
- DELETE
— 408

ACCESS PRIVILEGE — 410
- ☐ VIEW    ☐ MODIFY
- ☐ PRINT   ☐ COPY

OFFLINE EXPIRATION PERIOD
- 30 MINUTES — 412

OPTION SETTING — 414    OK    CANCEL

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-052851 filed Mar. 17, 2017.

BACKGROUND

(i) Technical Field

The present invention relates to an information processing apparatus and a non-transitory computer readable medium.

(ii) Related Art

Data is related to some subjects such as the creator or author of the data, destination users to which the data is provided, and the device that has generated the data. Attribute information of the data including, in addition to attribute items specific to the data such as the creation date and author of the data, attributes of the subject related to the data (such as the version of the device that has generated the data) enables to target data to be searched for using the attributes of the subject related to the data.

SUMMARY

According to an aspect of the invention, there is provided an information processing apparatus including an acceptance unit, a first search unit, and a second search unit. The acceptance unit accepts a search condition for attribute information of a subject. The first search unit searches for subject identification information corresponding to attribute information satisfying the search condition from a first management device that manages subject identification information identifying subjects and attribute information of the subjects in association with each other. The second search unit searches for data associated with the subject identification information found by the first search unit from a second management device that manages data and subject identification information identifying subjects related to the data in association with each other.

BRIEF DESCRIPTION OF THE DRAWINGS

An exemplary embodiment of the present invention will be described in detail based on the following figures, wherein:

FIG. 9 illustrates an example input screen for entering attribute data;

DETAILED DESCRIPTION

Figure 1:
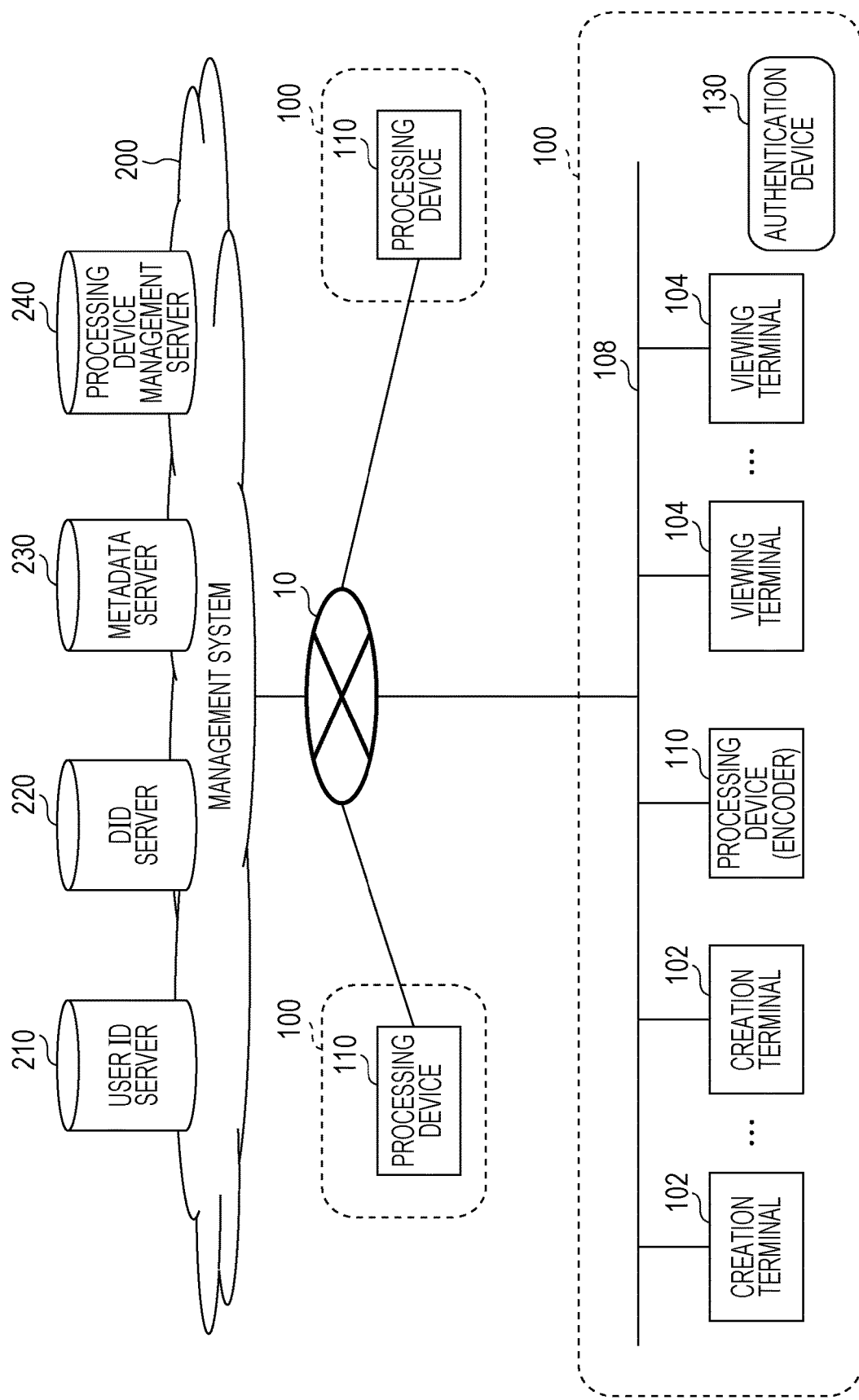
FIG. 1 illustrates an example configuration of a document management system.

FIG. 1 illustrates a schematic configuration of a document management system according to an exemplary embodiment.

Paper documents are easily copied by persons who have the documents and copies of the documents are passed to others. Persons who obtain the copies are able to read the documents. In this way, paper documents carry a high risk of leakage of information.

A document management system according to this exemplary embodiment is used to provide an environment that enables secure use of electronic documents to reduce the risk of leaking information from the documents. The term "document", as used herein, refers to content data distributed as a unit (for example, a file), and the content data is not limited to any particular type. The concept of the document includes, for example, but is not limited to, text data, document data created using word processor software, spreadsheet data created using spreadsheet software, computer aided design (CAD) data, image data, video data, audio data, multimedia data, page data displayed on a web browser, and any other data created, edited, and viewed on personal computers (PCs) and then printed.

The document management system includes multiple local systems 100 and a management system 200 that manages the local systems 100 (in particular, manages processing systems described below). The management system 200 is capable of individually communicating with the local systems 100 via a wide area network 10 such as the Internet.

Each of the local systems 100 includes one or more creation terminals 102, one or more viewing terminals 104, and a processing device 110, which are connected to a local network 108. The local network 108 is a private network (for example, a local area network (LAN)) set up in an organization such as an enterprise and is protected from the wide area network 10 by a firewall or the like. Fundamentally, each local system 100 includes a single processing device 110. When a private network in an organization is a large-scale network, individual network segments constituting the private network may each serve as one of the local systems 100, and each of the local systems 100 may be provided with a single processing device 110. For example, a network segment within a room for each department of a certain company is one of the local systems 100 of the department, and a single processing device 110 is placed in the segment. In the illustrated example, the local systems 100 are configured for respective companies or for respective departments of each company, and processing devices 110, each of which is included as a core of one of the local systems 100, are managed by the management system 200, which serves as a central management system.

The creation terminal 102 is a terminal used to create a document. Examples of the creation terminal 102 include a desktop or notebook personal computer, a workstation, a tablet terminal, a smartphone, a multifunction device, a scanner, a facsimile device, and a digital camera. The creation terminal 102 has installed therein an application for creating or editing a document or performing any other operation on a document. The creation terminal 102 further has installed therein software for requesting the document management system to distribute a created document. The software may be implemented as, for example, a device driver for exchanging information with the processing device 110, described below, or may be implemented as a web application.

The processing device 110 executes a protection process for converting a document created by the creation terminal 102 into a protected document (hereinafter also referred to as an "eDoc file"). The protected document is used in a secure environment provided by the document management system according to this exemplary embodiment. The protection process may be a process for encoding an original document into eDoc format, and in this sense the processing device 110 is an encoder. In the protection process, for example, a document is converted into data in a dedicated format designed for the system according to this exemplary embodiment, and is encrypted in form that can be decrypted by only users designated as destinations of the document. Either of the format conversion and encryption may be performed first.

The processing device 110 also creates metadata of the protected document and registers the created metadata in a higher-level system, namely, the management system 200. The metadata includes, for example, the bibliography of the protected document, information on destinations, and information on keys used by each destination to decrypt the protected document. The metadata includes multiple items, and, in accordance with a function provided through the corresponding service, the associated device or user assigns, edits, and updates data.

By way of example, some of the items are specified by a user who has instructed the document management system to register the document, and other items are created by the processing device 110. Alternatively, the management system 200 or the viewing terminal 104 may set the values of some items in the metadata. The processing device 110 transmits the generated protected document (eDoc file) to the viewing terminal 104 at the destination specified by the user.

The protected document, or eDoc file, is obtained by converting the original document into the dedicated format and encrypting the resulting data, and is also referred to as the eDoc body. In order to make the eDoc file viewable, the corresponding metadata is necessary. The eDoc file and the metadata are combined to form a viewable, complete protected document. A combination of an eDoc file and corresponding metadata is hereinafter referred to as an "eDoc".

The processing device 110 may have the wireless LAN access point function. In this case, the viewing terminal 104 is capable of communicating with the processing device 110 via wireless LAN.

The viewing terminal 104 is a terminal used to view the protected document (eDoc file). The term "view", as used herein, refers to the use of the protected document in a way corresponding to information content indicated by the document. For example, when the protected document has word processor data or a document such as drawings as information content, the term "view" is used to indicate that a user reads or browses the document displayed on the viewing terminal 104. When the information content indicated by the protected document is audio, the term "view" is used to indicate that a user listens to audio reproduced by the viewing terminal 104. The viewing terminal 104 is implemented by installing a viewer application for viewing the protected document into a general-purpose computer such as a desktop or notebook personal computer, a workstation, a tablet terminal, or a smartphone. Alternatively, a terminal for viewing purposes only, such as an electronic book reading terminal, may be provided with a function equivalent to that of the viewer application to form the viewing terminal 104. The viewer application has a function of decrypting an encrypted protected document by using information of metadata or a function of decoding data indicated by a dedicated format of a protected document into readable data. Note that a computer which does not include the viewer application supported by the document management system according to this exemplary embodiment is not able to decode data in the dedicated format into readable data.

The viewing terminal 104 may have a function of decrypting and decoding a protected document and displaying the resulting document, and a function of accepting modification (editing) of the displayed document from the user. The modified document has different content from the original protected document. The viewing terminal 104 may be able to send the edited document to the processing device 110 and register the document in the document management system (i.e., encode the document into a protected document). Accordingly, a single terminal may have the functions of both the creation terminal 102 and the viewing terminal 104. An eDoc includes a privilege granted to a viewer (access privilege information in the metadata described below), and the privilege may include, for example, the writing restriction to the eDoc and the restriction of redistribution destinations. In the case of an eDoc including access privilege information that specifies such restrictions, the viewing terminal 104 accepts the modification (editing) operation from the viewer only within the range of the writing restriction, and also accepts the designation of destinations of redistribution of a new modified eDoc only within the range of the restriction of redistribution destinations.

In this exemplary embodiment, a tool for authenticating a user who uses the document management system according to this exemplary embodiment is implemented as an authentication device 130 carried by the user, by way of example. Like an integrated circuit (IC) card, the authentication device 130 is a device having identification information specific to the user who carries the authentication device 130 and configured to execute data processing for user authentication in response to a request from an external device. The authentication device 130 may be a mobile terminal such as a smartphone having functions equivalent to those of such an IC card used for personal authentication. The viewing terminal 104 or the creation terminal 102 has a function of communicating with the authentication device 130 by using a wireless communication protocol such as Near Field Communication (NFC). The viewing terminal 104 or the creation terminal 102 exchanges information for user authentication with the authentication device 130 in accordance with a predetermined protocol and authenticates the user who carries the authentication device 130. Alternatively, a server in the document management system according to this exemplary embodiment, such as the processing device 110 or the management system 200, may perform actual user authentication, and the viewing terminal 104 or the creation terminal 102 may act as an intermediate device between the server and the authentication device 130 to transfer data therebetween. The viewing terminal 104 or the creation terminal 102 may have the function of the authentication device 130.

The management system 200 manages the processing devices 110 in the respective local systems 100. The management system 200 further manages metadata of protected documents generated by the processing devices 110 and provides the metadata to the viewing terminals 104 in response to requests. The management system 200 is constituted by a single computer or multiple computers capable of communicating with one another, and has the functions of a user ID server 210, a DID server 220, a metadata server 230, and a processing device management server 240.

The user ID server 210 is a server that manages information on each user who uses the document management system. There are two classes of users who use the document management system. One class is contractor who has entered into a contract with the operator of the document management system to use the document management system, and the other class is general user who actually uses the system under the contract to register or view a document. For example, the following case may be typical. The processing device 110 is located on the local network 108 within a company that is a contractor, and employees of the company who are general users use the document management system via the processing device 110. The user ID server 210 holds and manages information regarding the contractor and information regarding the general users.

The DID server 220 manages a document ID (DID) that is identification information (ID) of a protected document. A protected document is actually assigned a DID by the processing device 110 that has created the protected document. The DID server 220 assigns the privilege to issue DIDs (hereinafter referred to as "DID issuance privilege" or "issuance privilege") and the issuance quota (the number of issuable DIDs) to the processing device 110, and receives and records a report of DIDs actually issued by the processing device 110 within the issuance privilege and the issuance quota. Thus, the DID server 220 may prevent or reduce the occurrence of unauthorized DIDs and may sense a document having an unauthorized DID.

The metadata server 230 holds and manages metadata of protected documents (eDoc files) generated by the processing devices 110. Upon receipt of a request for metadata of a protected document from a user via the viewing terminal 104, the metadata server 230 provides the metadata to the viewing terminal 104 if the user is an authorized person. A user (viewer) who requests metadata is identified as an "authorized person" for the metadata server 230 when the combination of the user and the viewing terminal 104 used by the user to send the request matches a combination of a destination user and a destination viewing terminal 104 that is specified in destination information (described in detail below) in the metadata held by the metadata server 230 in association with the DID of the eDoc file (the DID is included in the request).

The processing device management server 240 is a server that manages the status (state) of each processing device 110.

Figure 2:
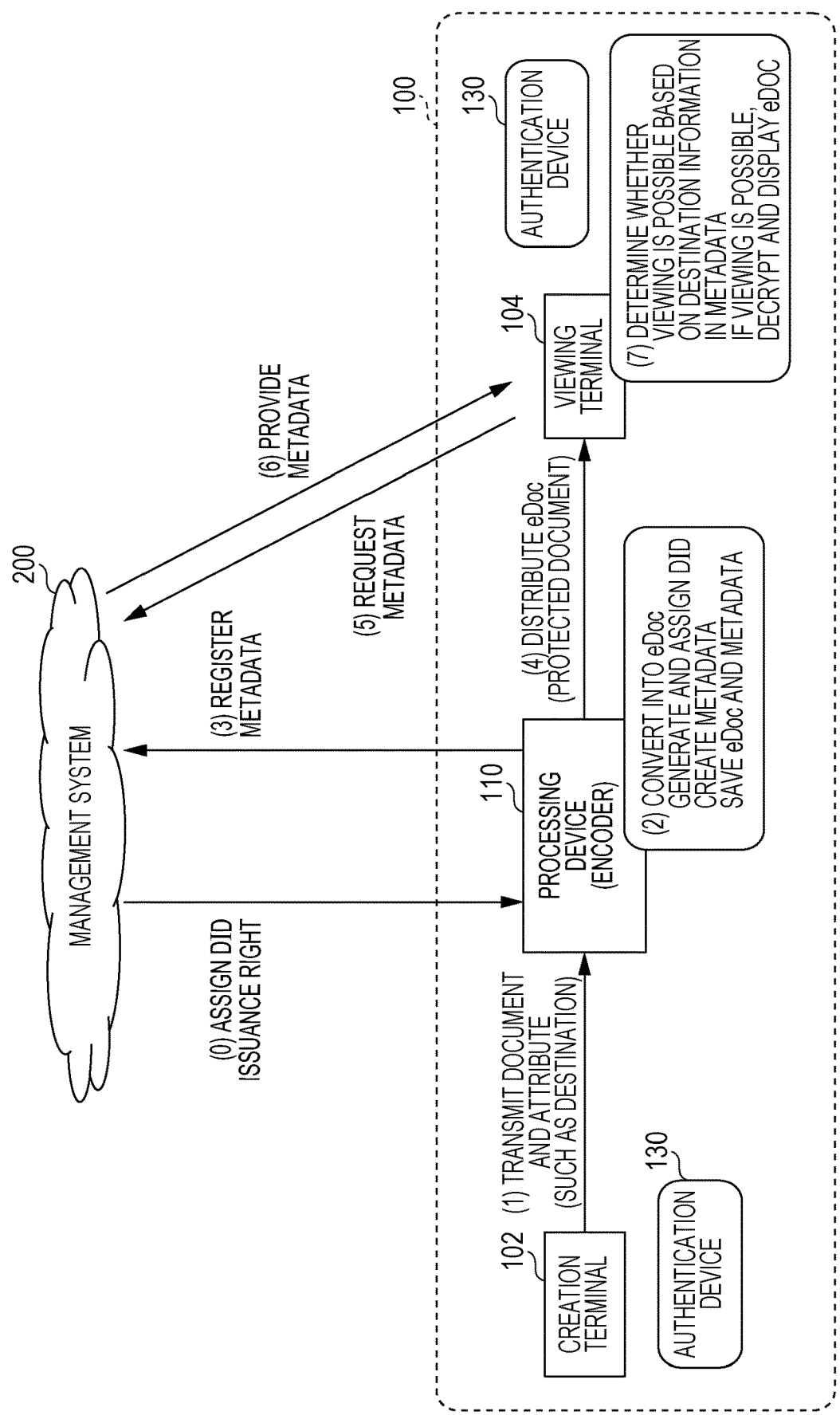
FIG. 2 illustrates an overview of distribution and viewing of a document using the document management system.

A mechanism according to this exemplary embodiment will be schematically described with reference to FIG. 2.

(0) The management system 200 (the DID server 220) assigns in advance the right to issue document IDs (DIDs) (hereinafter referred to as the "DID issuance right") and the issuance quota associated with the DID issuance right (the number of documents) to the processing device 110 in the local system 100. The DID issuance right is not unlimitedly permitted but is limited by the issuance quota of the management system 200. That is, the processing device 110 is capable of assigning DIDs based on the simultaneously assigned issuance right to a number of documents not exceeding the value indicated by the issuance quota assigned from the management system 200. When the issuance quota is used up, a new issuance right and issuance quota are assigned to the processing device 110 by the management system 200.

(1) A user who desires to register (i.e., distribute) a document in the document management system according to this exemplary embodiment gives an instruction to the creation terminal 102 to register the document (for example, selects "registration" in an application menu). Upon receipt of the request, the creation terminal 102 requests user authentication. The authentication may be performed by entering a user ID and a password or may be performed by detecting (or reading) authentication information stored in the authentication device 130 with a card reader of the creation terminal 102. The user authentication may be performed by the creation terminal 102 or by the processing device 110 in which the document is registered. Then, the user selects a document to be registered in the document management system from among the documents held in the creation terminal 102 and makes an instruction to register the selected document.

Upon receipt of the instruction from the user to register the document, the creation terminal 102 (more specifically, a registration process program installed in the creation terminal 102) accepts input of an item to be selected by the user (for example, the destination of the document) among items within the attribute data of the document. The designation of a combination of the user and the viewing terminal 104 as a destination may be accepted. In this case, if a combination of the user and a viewing terminal 104 used by the user to view the document matches a combination designated as a destination, the user is authorized to view the document.

The creation terminal 102 transmits the attribute data to the processing device 110 together with the data of the document. The attribute data includes an attribute item input by the user, such as the destination, and other attribute items generated by the creation terminal 102, such as information on the registrant and the creation date and time. The creation terminal 102 may include a driver for converting documents in various formats created by various applications into a uniform format available for the viewing terminal 104. For example, the driver converts data indicating a still document image, such as word processor data, spreadsheet data, or CAD data, into a document written in a page description language in a way similar to that of a printer driver. For example, when the original data is audio data, the driver converts the audio data into data (a document) in a specific audio data format supported by the document management system according to this exemplary embodiment (in particular, the viewing terminal 104).

(2) The processing device 110 performs a protection process on the document to be registered, which is received from the creation terminal 102, to generate a protected document (eDoc file). In this generation operation, the processing device 110 encodes the received document into the format dedicated to the document management system according to this exemplary embodiment and encrypts the encoded data by using a generated encryption key to generate an eDoc file. The order of the encoding operation and the encryption operation may be reversed. Further, the processing device 110 assigns a unique DID to the eDoc. The DID includes information (an issuance privilege key described below) used to prove that the assignment of the DID is based on the issuance privilege provided by the management system 200, and information (an issuance certificate key described below) used to prove that the DID has been assigned by the processing device 110. The data structure of the DID will be described below in conjunction with a detailed example. The assigned DID is incorporated into the eDoc file (as an item in the properties of the file, for example).

Further, the processing device 110 generates metadata corresponding to the generated eDoc file. The metadata includes attribute data received together with the document from the creation terminal 102 and the values of the attribute items generated by the processing device 110, such as the DID, the ID of the processing device 110, the encoding date and time, and encryption key information. The encryption key information included in the metadata is information indicating a key for unlocking the encrypted eDoc file. If a common key system is used for encryption, the encryption key information is information indicating a common key. If the common key itself is included in plaintext in the metadata, the common key may be stolen or intercepted and abused. To eliminate the concern about such abuse of the common key, the common key is encrypted using a public key for the destination user to produce encryption key information which is then included in the metadata.

Further, the processing device 110 saves the generated eDoc file and metadata in an internal database.

(3) The processing device 110 transmits the generated metadata to the management system 200 for registration. The management system 200 (the metadata server 230) saves the received metadata.

(4) The processing device 110 distributes the generated eDoc file to the viewing terminal 104 designated as the destination. The distribution may be performed using a push or pull distribution system or using both distribution systems (for example, the eDoc file is distributed using the "push" method at the time of creation, and the viewing terminal 104 that fails to receive the eDoc file because of being inactive at that time receives the distributed eDoc file using the "pull" method). The distribution is performed via the local network 108 in the local system 100.

(5) The eDoc file received by the viewing terminal 104 is protected by encryption or the like and is not viewable as is. When the user desires to view the eDoc file on the viewing terminal 104, a card reader of the viewing terminal 104 detects (or reads) authentication information stored in the authentication device 130 of the user to authenticate the user. Then, the user gives an instruction on the screen of the viewing terminal 104 to view the eDoc file. Upon receipt of the instruction, the viewing terminal 104 accesses the management system 200 and requests the metadata of the eDoc file. This request includes the DID of the eDoc file.

(6) The management system 200 (the metadata server 230) transmits the most recent metadata of the eDoc file requested by the viewing terminal 104 to the viewing terminal 104.

(7) Upon receipt of the requested metadata from the management system 200, the viewing terminal 104 determines whether the destination information included in the metadata includes the combination of the viewing terminal 104 and the user who is currently using the viewing terminal 104 (the user has been authenticated using the authentication device 130). If the combination is not included, the user does not have the privilege to view the eDoc file on the viewing terminal 104. Thus, the viewing terminal 104 does not open the eDoc file and displays an error message indicating that the user does not have the viewing privilege. If the combination is included, the user has the privilege to view the eDoc file on the viewing terminal 104. In this case, the viewing terminal 104 decrypts the eDoc file by using the encryption key information included in the metadata and displays the eDoc file on a screen (that is, the viewing terminal 104 outputs the eDoc file in a manner corresponding to the information content regarding the eDoc file).

The metadata may include a period of expiry. The period of expiry is determined by, for example, adding a prescribed expiration period or an expiration period specified by the distributor or any other person to the date and time when the metadata was transmitted. After the metadata has expired, the viewing terminal 104 is not able to open (decrypt and display) the eDoc file unless the viewing terminal 104 acquires the metadata from the management system 200 again. The viewing terminal 104 having the capability of communicating with the processing device 110 or the management system 200 acquires the most recent metadata available as of the time of designation of the eDoc file as a target to be viewed from the processing device 110 or the management system 200 and determines whether viewing is possible on the basis of the most recent metadata.

After metadata is initially registered in the management system 200, destination information or access privilege information included in the metadata may be changed by the distributor or a person who is given the privilege to change the destinations (for example, a person who has the privilege to edit data). Even a user designated as a destination when an eDoc is created and registered may be removed from a destination list due to a later change. In this case, the viewing terminal 104 senses the removal of the user from the destination list by using the destination information included in the most recent metadata acquired from the management system 200 and does not display the eDoc file.

Next, an example of the data content of metadata 300 of an eDoc file will be described with reference to FIG. 3.

Of the items included in the metadata 300, the "DID" specifies a document ID assigned by the processing device 110 that has generated the eDoc file. The "document name" specifies the name or title of the eDoc file.

The "distributor ID" specifies the user ID of a person (hereinafter referred to as a distributor) who has distributed the eDoc file, that is, a person who has registered a document in the processing device 110 by using the creation terminal 102 and has distributed the document via the processing device 110.

The "encoding date and time" specifies the date and time when the document obtained from the creation terminal 102 was encoded (protection process) and an eDoc file of the document was created. The "processing device ID" specifies identification information of the processing device that has executed the protection process. The "encryption information" specifies information concerning encryption for generating the eDoc file, and the information includes the name of encryption software used for encryption, the version of the encryption software, and key information indicating a key for unlocking encryption (decryption). The key information is obtained by, for example, encrypting the key for decryption by using a public key for each destination user. The "keyword information" specifies a list of keywords extracted from the eDoc file (or original data). The keyword information is used to search for the eDoc file, for example.

The "destination information" specifies information indicating a user and a viewing terminal designated as the distribution destination of the eDoc file by the distributor. In the example illustrated in FIG. 3, the destination information includes, for each destination user, the user ID of the user and the ID (identification information) of the viewing terminal 104 to be used by the user for viewing. Multiple viewing terminals 104 available for the user to view the eDoc file may be specified. In this case, combinations of the user ID of the user and the IDs of the multiple viewing terminals 104 are included in the destination information.

In another example, a destination user may be able to view the eDoc file by using any of the viewing terminals 104 designated as destinations. In this case, the destination information includes a list of IDs of destination users and a list of IDs of viewing terminals 104 designated as destinations. Candidate viewing terminals 104 designated as destinations may be, for example, but not limited to, a terminal shared in a department, terminals placed in a room for a department, and terminals placed in meeting rooms. It is unknown which user in the organization uses a shared terminal or a terminal placed in a room (which may be a shared terminal), whereas the types of these terminals are known at least by the distributor. It is also known that such terminals are less likely to be taken out of the organization without permission. Thus, these terminals are suitable as destinations to which a confidential document is distributed. In this way, a destination user may be allowed to use any of the viewing terminals 104 designated as destinations so long as an eDoc is used on such shared terminals whose identity has been verified.

The "access privilege information" specifies information indicating the privilege to use the eDoc file which is assigned to the destination user by the distributor.

The "offline expiration period" specifies information indicating the length of the expiration period of the metadata. That is, even in a state where the viewing terminal 104 fails to access the management system 200 (offline state), when metadata acquired and cached during the previous viewing of the eDoc file is present and when the "offline expiration period" from the date and time of acquisition of the metadata has not passed, the viewing terminal 104 decrypts and displays the eDoc file by using the encryption key information in the metadata. In contrast, in the offline state, if the offline expiration period in cached metadata of an eDoc file to be viewed has passed, the viewing terminal 104 does not decrypt or display the eDoc file. Within a period during which the viewing terminal 104 is able to access the management system 200 (i.e., the viewing terminal 104 is kept online), in response to an instruction given from a user to view an eDoc file, the viewing terminal 104 acquires the most recent metadata of the eDoc file from the management system 200 (in particular, the metadata server 230) for use.

The "original data information" specifies information indicating whether the original data before the eDoc file was generated (encoded) has been saved, and, if the original data has been saved, information (for example, Uniform Resource Locator (URL)) indicating the location where the original data is saved. The original data is either or both of a document (that has not been subjected to a protection process) sent from the creation terminal 102 to the processing device 110 and application data (for example, if the document is page description language data, word processor software data before conversion into the data) on which the document is based, for example.

The "document acquisition date and time" specifies the date and time when the viewing terminal 104 acquired the file of the eDoc body data (i.e., the eDoc file). The "metadata acquisition date and time" specifies the date and time when the viewing terminal 104 acquired the currently cached most recent metadata of the eDoc file from the management system 200. The document acquisition date and time and the metadata acquisition date and time are not included in the metadata held in the management system 200, and are added by the viewing terminal 104 for its management to the metadata acquired from the management system 200.

Figure 3:
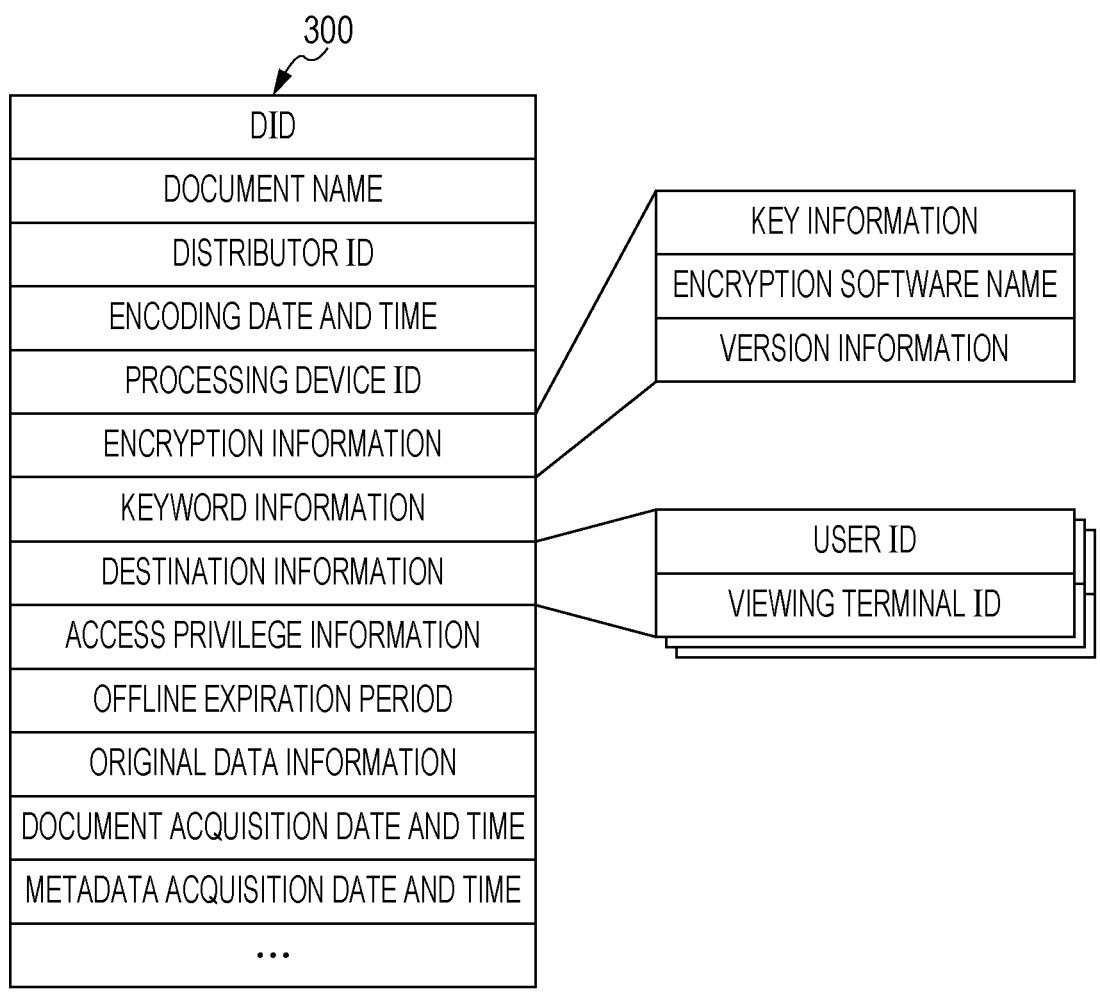
FIG. 3 exemplarily illustrates data content of metadata.

Of the items in the metadata illustrated in FIG. 3, the items of information generated by the processing device 110 are a DID, an encoding date and time, a processing device ID, encryption information, and keyword information. The document name, the distributor ID, the destination information, the access privilege information, the offline expiration period, and the original data information derive from the document or the attribute data sent from the creation terminal 102 to the processing device 110.

Next, the data information content managed by the servers 210 to 240 in the management system 200 will be exemplarily described.

Figure 4:
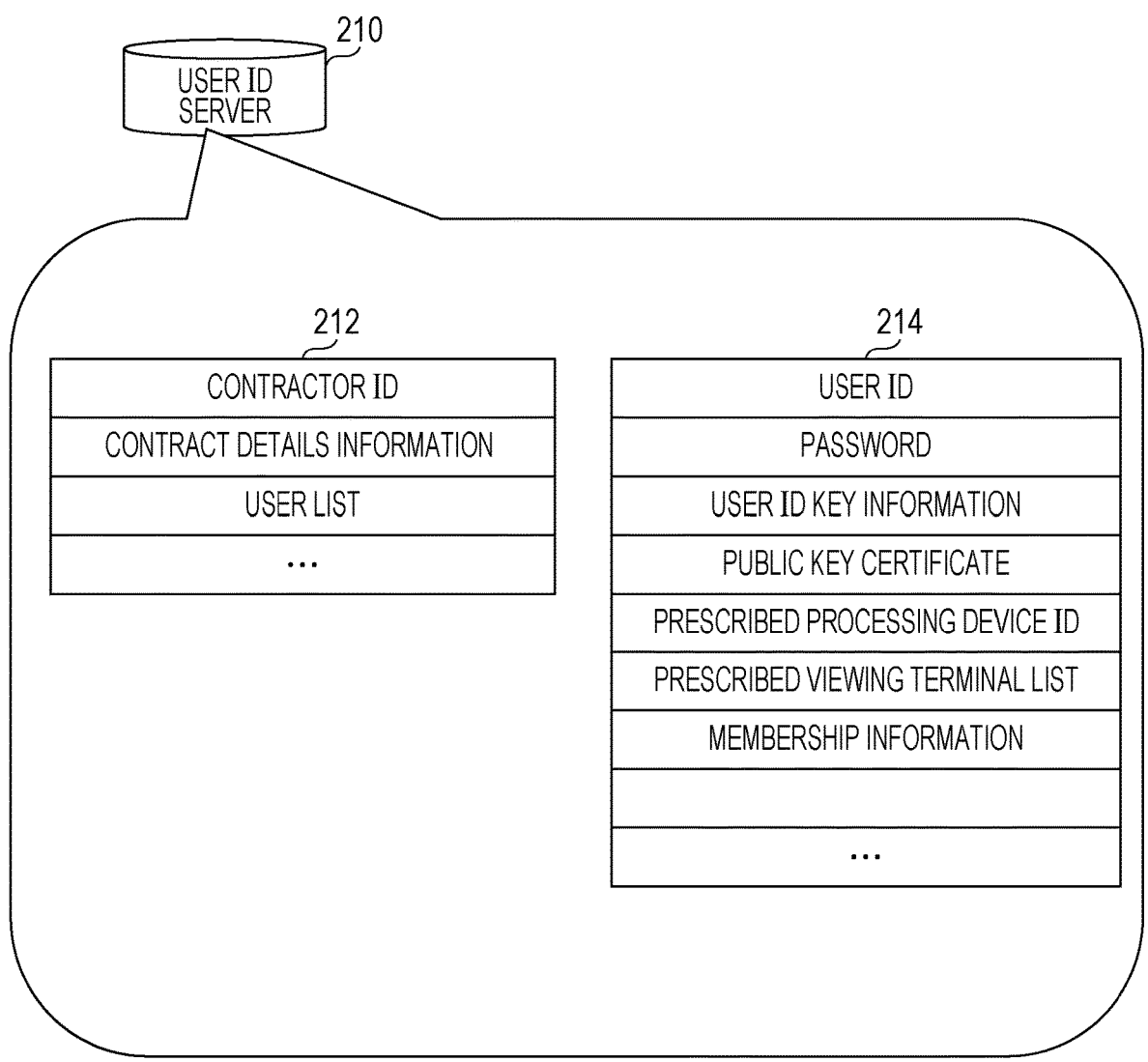
FIG. 4 exemplarily illustrates data content managed by a user ID server.

First, an example of the data content managed by the user ID server 210 will be described with reference to FIG. 4. The user ID server 210 stores contractor data 212 of each contractor and user data 214 of each general user.

The contractor data 212 includes a contractor ID, contract details information, and a user list. The contractor ID is identification information of a contractor (for example, an organization or a department in the organization) who has entered into a contract with the operator of the document management system. The user list is a list of user IDs of general users (for example, members belonging to the contractor, namely, the organization) who use the document management system under the contract made by the contractor.

The user data 214 of each general user includes the user ID of the general user, a password, user ID key information, a public key certificate, a prescribed processing device ID, a prescribed viewing terminal list, and membership information. The user ID key information is authentication information of the user, which is used by the authentication device 130 of the user. The public key certificate is a digital certificate used to verify a public key for the user. The prescribed processing device ID is the ID of the processing device 110 in which the user has been registered. A user is typically registered in a processing device 110 placed in an office to which the user belongs, and the processing device 110 is the prescribed processing device for the user. The prescribed viewing terminal list is a list of IDs of one or more viewing terminals that the user often uses. The viewing terminals included in this list are candidate destination terminals when the eDoc is distributed to the user. The membership information is information identifying the organization, the department, or the like to which the user belongs and specifies, for example, the contractor ID of the organization or department.

Next, an example of the data content managed by the DID server 220 will be described with reference to FIG. 5.

Figure 5:
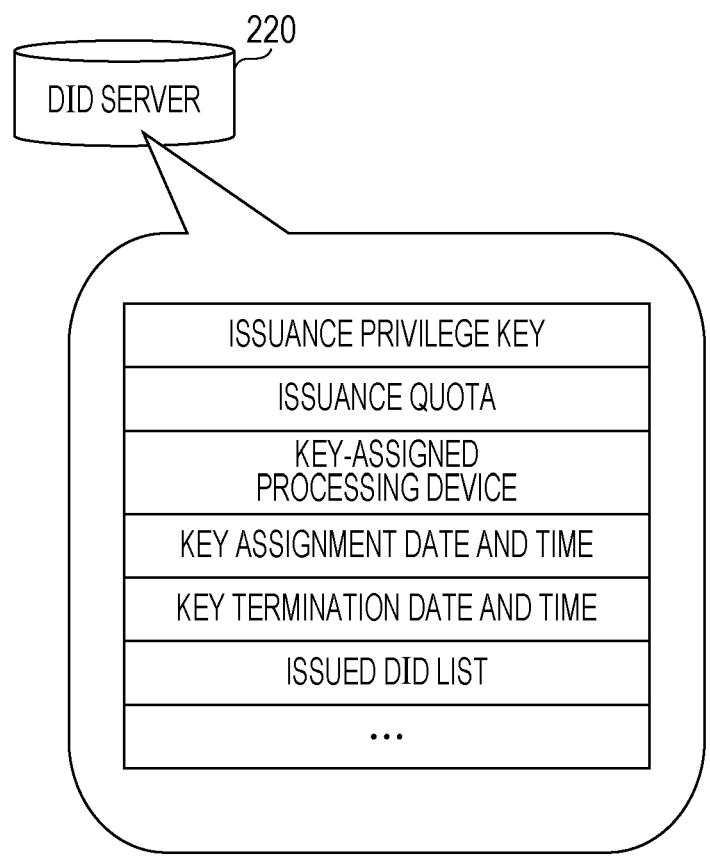
FIG. 5 exemplarily illustrates data content managed by a DID server.

As illustrated in FIG. 5, the DID server 220 holds, for each issuance privilege key issued to a processing device, information on the following items: an issuance quota, a key-assigned processing device, a key assignment date and time, a key termination date and time, and an issued DID list.

The issuance privilege key is key information (for example, a randomly generated character string) used to verify the DID issuance privilege assigned to the processing device 110 by the DID server 220. The issuance privilege key assigned by the DID server 220 is included in a DID issued by the processing device 110 to prove that the DID has been issued under the authorized issuance privilege.

The issuance quota is assigned to the processing device 110 together with the issuance privilege key and is an upper limit of DIDs that can be issued (the maximum number of documents that can be assigned DIDs). When the pair of issuance privilege key and issuance quota is assigned by the DID server 220, the processing device 110 is able to assign a unique DID to each of eDoc files up to the upper limit indicated by the issuance quota.

The key-assigned processing device indicates the ID of the processing device 110 to which the issuance privilege key (and the issuance quota) is assigned. The key assignment date and time is the date and time when the issuance privilege key was assigned to the processing device 110. The key termination date and time is the date and time when the key-assigned processing device 110 terminated use of the issuance privilege key. That is, the key termination date and time is the date and time when the processing device 110 completed assignment of a number of DIDs equal to the upper limit indicated by the issuance quota assigned together with the issuance privilege key to eDoc files. In a mechanism that allows the processing device 110 to request the DID server 220 after using up the issuance quota to assign the next issuance privilege key and issuance quota, the key termination date and time of a certain issuance privilege key (referred to as a first key) is not explicitly recorded but the key assignment date and time when an issuance privilege key subsequent to the first key was assigned to the processing device 110 may be used as the key termination date and time of the first key. The issued DID list is a list of DIDs issued by the key-assigned processing device 110 using the issuance privilege key and the issuance dates of the DIDs. Each time the key-assigned processing device 110 issues a DID using the issuance privilege key, the processing device 110 reports the DID to the DID server 220, and the DID server 220 adds the reported DID and the issuance date of the DID to the issued DID list corresponding to the issuance privilege key included in the DID.

The metadata server 230 stores metadata of an eDoc file sent from each processing device 110. The data content of the stored metadata is similar to that exemplarily illustrated in FIG. 3. Note that the metadata server 230 does not manage the items used by only the viewing terminal 104, such as the document acquisition date and time and the metadata acquisition date and time, among the items of the metadata exemplarily illustrated in FIG. 3.

Next, data managed by the processing device management server 240 will be described with reference to FIG. 6. The processing device management server 240 stores, for each processing device 110 to be managed, a status history 242 of the processing device 110. The status history 242 includes, in association with the ID of the processing device 110, information on the status 244 of the processing device 110 as of the time of creation and update (creation/update date and time).

The status 244 as of each point in time includes an installation location, a contractor ID, an administrator name, an administrator contact, a registered user list, software information 246, hardware information 248, an available disk space, and security certificate information. The installation location is information indicating the location where the processing device 110 is placed, and includes information such as the address, the building name, and the floor. The contractor ID is the ID of a contractor who uses the processing device 110. The administrator name is the name of the administrator of the processing device 110. The administrator is a user who manages the processing device 110 in the department or the like in which the processing device 110 is placed. The administrator contact is information (for example, the electronic mail address) on the contact of the administrator. The registered user list is a list of user IDs of users registered in the processing device 110 (in other words, users for whom the processing device 110 is designated as the "prescribed processing device").

The software information 246 includes an encoding software name, an encoding software version, an encryption software name, an encryption software version, and the names and versions of other pieces of software installed in the processing device 110. The encoding software is software for converting (encoding) a document input from the creation terminal 102 into a dedicated format of the document management system. The encryption software is software for encrypting a document (for example, a document obtained as a result of conversion into the dedicated format).

The hardware information 248 includes the following items: encoder circuit information, an encoder circuit FW version, the manufacturer name of the processing device 110, and so on. The encoder circuit information is information indicating the model name of the hardware circuit used in the encoding process. The encoder circuit FW version is the version of the firmware (FW) of the encoder circuit.

The available disk space is the available space of a secondary storage device such as a hard disk or a solid-state disk of the processing device 110 as of that point in time.

The security certificate information is information identifying security certificates installed in the processing device 110 as of that point in time, such as the subject identifier and issuer identifier of each certificate and the date and time of issuance of the certificate.

Although not illustrated to avoid complexity, the status 244 further includes font types (a list of font names) installed in the processing device 110, an address (for example, Internet protocol (IP) address) used for network communication, the device ID of a secondary storage device (such as a hard disk drive) included in the processing device 110, information indicating the content of customization to connect the processing device 110 to a processor in an infrastructure system of the organization in which the processing device 110 is placed, the date and time of installation of an encryption key used by the processing device 110 (for communication path encryption, signature, or the like), and so on.

Figure 7:
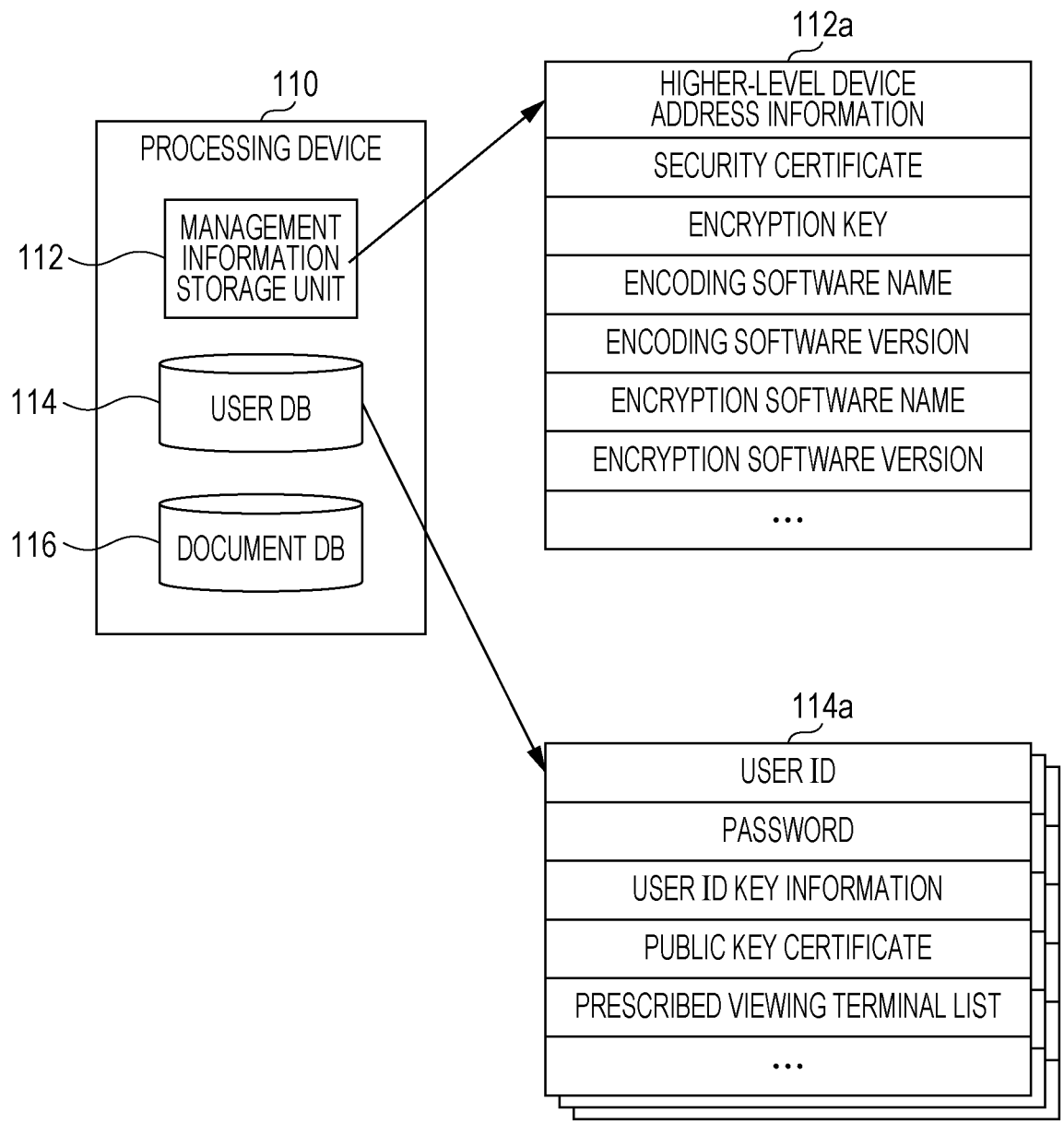
FIG. 7 exemplarily illustrates the configuration of a processing device and data content stored in the processing device.

Next, databases held by the processing device 110 will be described with reference to FIG. 7. As illustrated in FIG. 7, the processing device 110 includes a management information storage unit 112, a user database (DB) 114, and a document DB 116.

The management information storage unit 112 stores management information 112a. The management information 112a includes the following items: higher-level device address information, a security certificate, an encryption key, an encoding software name, an encoding software version, an encryption software name, an encryption software version, and so on. The higher-level device address information is information indicating the respective communication addresses (such as the IP address or the URL) of higher-level devices that manage the processing device 110. Examples of the higher-level devices include the management system 200, the servers 210 to 240 in the management system 200, an in-house management system 150, and servers 152 to 156 in the in-house management system 150 described below. The security certificate is a digital certificate used by the processing device 110 for secure communication with other devices on a network in accordance with the public key infrastructure. The processing device 110 holds security certificates of higher-level devices with which the processing device 110 frequently communicates. The processing device 110 may hold security certificates of users who use the creation terminal 102 or the viewing terminal 104. The encryption key is an encryption key for the processing device 110, which is used by the processing device 110 for purposes such as encryption and decryption during communication with other devices on a network or digital signature (or the generation of its relevant verification information) by the processing device 110, and includes a pair of secret key and public key assigned to the processing device 110 in the public key infrastructure, for example. The encoding software and the encryption software are respectively pieces of software for encoding (conversion into the dedicated format) and encryption which are installed in the processing device 110.

The user DB 114 stores user information 114a on users registered in the processing device 110 (in other words, users for whom the processing device 110 is designated as the "prescribed processing device"). The user information 114a on each registered user includes the following items: a user ID, a password, user ID key information, a public key certificate, a prescribed viewing terminal list, and so on. These items have been described in the description of the data included in the user ID server 210 described above (see FIG. 4).

The document DB 116 stores an eDoc file generated by the processing device 110 and metadata corresponding to the eDoc file. The eDoc file and the metadata include information of the DID and are associated with each other. The document DB 116 may store the original data before being encoded into an eDoc (the original data received from the creation terminal 102) in association with the DID of the eDoc.

Each of the creation terminal 102 and the viewing terminal 104 stores, for each user who uses the terminal, authentication information (such as the user ID and the password) of the user, the ID of the prescribed processing device, address information of the prescribed processing device, address information of a higher-level device (for example, the management system 200 or the in-house management system 150 described below), security certificates of the prescribed processing device and the higher-level device, an encryption key used for communication path encryption, and so on.

Process Flow in System

When the processing device 110 is placed on the local network 108, a maintenance person who performs maintenance of the processing device 110 registers in the processing device 110 information on users who use the processing device 110 and information on the creation terminals 102 or the viewing terminals 104 that are likely to be used by the users. The registered information on the users is transferred to and also registered in a higher-level device, namely, the user ID server 210 (or a local user ID server 152 described below). If the number of users who use the processing device 110 increases or decreases after the processing device 110 has been placed, the maintenance person additionally registers information on a new user in the processing device 110 or deletes information on a user who no longer uses the processing device 110 from the processing device 110. The addition and deletion of a user are reported to the higher-level device such as the user ID server 210, and the information held by the higher-level device is updated accordingly. The maintenance person also installs into each of the creation terminals 102 software (for example, a device driver of the processing device 110) for requesting the processing device 110 to register and distribute a document. The maintenance person also registers in each of the viewing terminals 104, for example, information (such as a device name, a communication address, and wireless access settings) for communicating with the processing device 110.

Next, a process flow for the registration and distribution of a document via the document management system according to this exemplary embodiment will be described with reference to FIG. 8.

(1)-1: In response to an instruction given by a user (distributor) to the creation terminal 102 to register a document, the creation terminal 102 displays a screen for prompting the user to input login authentication information (for example, a user ID and a password or authentication information stored in the authentication device 130). When the distributor inputs authentication information in accordance with the request, the creation terminal 102 transmits the authentication information to the processing device 110 via the local network 108.

(1)-2: Upon receipt of the login authentication information, the processing device 110 performs user authentication by using the information. It is assumed here that the user authentication is successful (i.e., the distributor has been verified as an authorized user). In the illustrated example, login authentication is performed using a login ID and a password. If the creation terminal 102 supports communication with the authentication device 130, login authentication may be performed using the authentication device 130.

(2)-1: If the login authentication is successful, the user selects a document to be registered in the document management system (and to be distributed to other users) from among the documents held in the creation terminal 102 and makes an instruction to register the selected document in the processing device 110. Then, software (for example, a device driver) for performing interface with the processing device 110 is activated. The software accepts input of attribute data of the document from the user and transmits the accepted attribute data and the data of the document to the processing device 110.

FIG. 9 illustrates an example of an input screen 400 for entering attribute data. The input screen 400 includes a destination user selection menu 402, a destination user list field 404, a destination terminal selection menu 406, a destination terminal list field 408, an access privilege setting field 410, an offline expiration period menu 412, and an option setting invoke button 414.

The destination user selection menu 402 is a pull-down menu in which a list of possible users to which the document can be distributed is provided. The possible users are users registered in the processing device 110, and a list of IDs and names of the possible users may be acquired from the processing device 110. Alternatively, the creation terminal 102 may acquire a list of users from the local user ID server 152 (see FIG. 12), described below, which manages information on users of the document management system who belong to an organization to allow the distributor to select a user registered in other processing devices 110 within the organization as a destination. In this case, the destination user selection menu 402 shows users in such a manner that one of the processing devices 110 in which each user is registered is distinguishable from the other processing devices 110. For example, each user may be displayed in a different color or font depending on the processing device 110 in which the user is registered. Alternatively, the menu may be hierarchically structured such that one of the processing devices 110 is first selected to invoke a list of users registered in the processing device 110 and then a user to be designated as a destination may be selected from the list. The destination user list field 404 shows a list of destination users selected by the user. When the distributor selects a destination user on the destination user selection menu 402 and presses an "Add" button to the right of the destination user selection menu 402, the user ID or user name of the selected destination user is added to the destination user list field 404. When the distributor selects a destination user in the destination user list field 404 and presses a "Delete" button to the right of the destination user list field 404, the selected destination user is deleted from the destination user list field 404 (i.e., the selected destination user is no longer a destination).

The destination terminal selection menu 406 is a pull-down menu in which a list of possible viewing terminals (viewers) 104 to which the document can be distributed is provided. The possible viewing terminals 104 are viewing terminals registered in the processing device 110, and a list of IDs and names of the possible viewing terminals 104 may be acquired from the processing device 110. Alternatively, for example, the processing device 110 or the local user ID server 152 (see FIG. 12, described in detail below) may include a list of viewing terminals 104 within an organization which have been registered in the document management system, and the creation terminal 102 may present the list to the distributor to allow the distributor to select a viewing terminal 104 of a user registered in other processing devices 110 within the organization as a destination. As in the destination user list field 404, the destination terminal list field 408 shows a list of destination viewing terminals 104 selected by the distributor in the destination terminal selection menu 406.

For each destination user, the destination viewing terminal 104 corresponding to the user may be designated. To achieve this designation, for example, each time a destination user is selected in the destination user list field 404, the creation terminal 102 may acquire a list of prescribed viewing terminals of the user from the processing device 110 (or the local user ID server 152 or the user ID server 210) and set the list in the destination terminal selection menu 406. If the distributor does not explicitly select a destination viewing terminal 104 for the destination user, a specific prescribed viewing terminal in a list of prescribed viewing terminals associated with the user (for example, the prescribed viewing terminal at the top of the list) is automatically selected as the destination viewing terminal 104.

The access privilege setting field 410 is a field for setting the privilege of the destination user to access (use) the document. In the illustrated example, checkboxes for four privilege items to view, modify (edit), print, and copy the document are shown. The distributor checks the checkbox for an item granted to the destination user for the document.

The offline expiration period menu 412 is a pull-down menu showing a list of options of an offline expiration period to be set for the document. The distributor selects an offline expiration period to be set for the document currently registered in the system and distributed from among several options shown in the offline expiration period menu 412.

Figure 10:
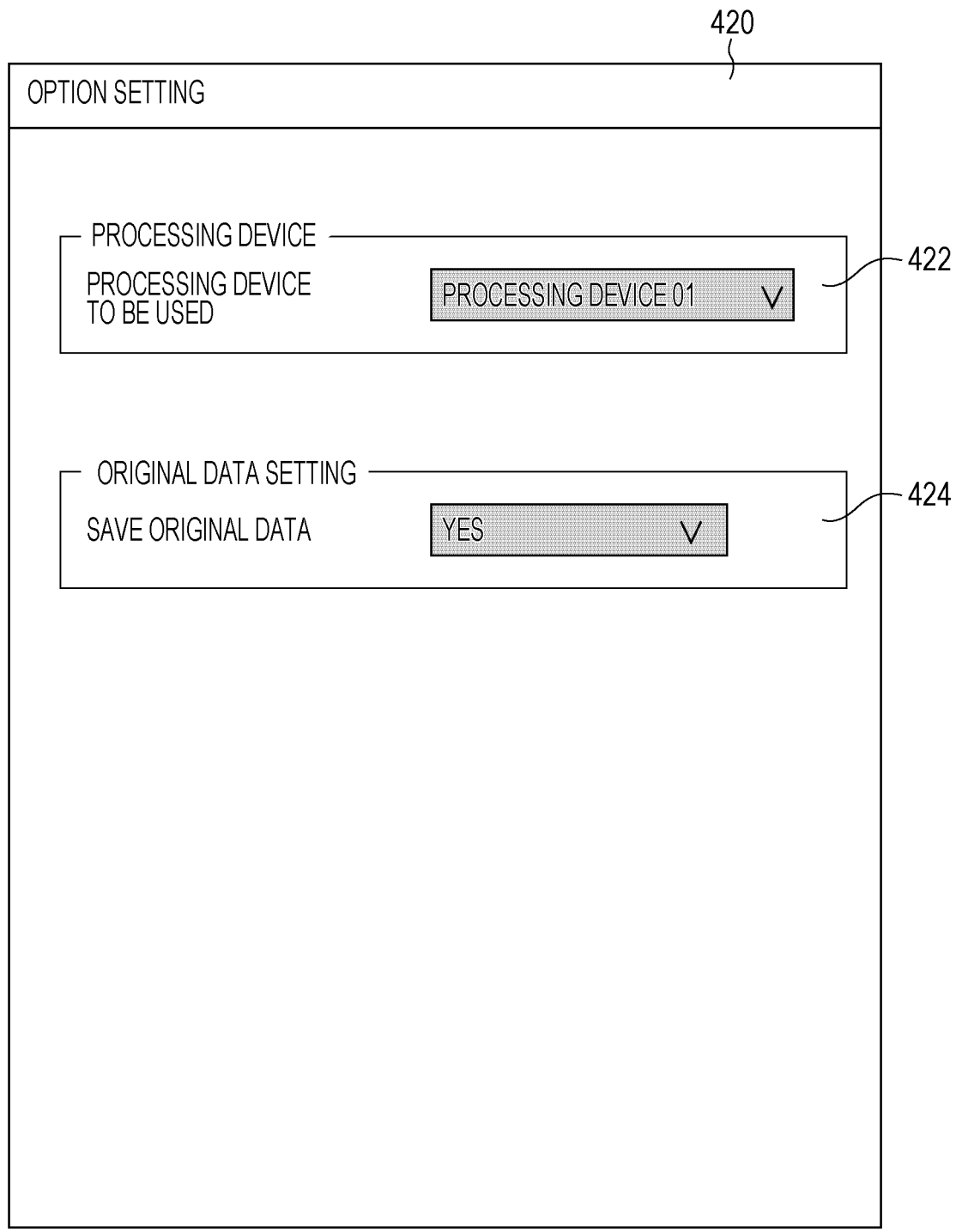
FIG. 10 illustrates an example option setting screen.

When the option setting invoke button 414 is pressed, the creation terminal 102 displays an option setting screen 420 exemplarily illustrated in FIG. 10. The option setting screen 420 includes a processing device selection field 422 and an original data setting field 424. The processing device selection field 422 includes a pull-down menu showing a list of possible processing devices 110 to which the document can be transmitted. This menu includes a list of processing devices 110 selectable by the creation terminal 102. The processing devices 110 included in the list include a processing device 110 (a single processing device 110, typically, or multiple processing devices 110) located in the local system 100 to which the creation terminal 102 belongs. The list may also include processing devices 110 in other local systems 100 within the same organization. The original data setting field 424 shows a pull-down menu for accepting selection of whether the original data on which the eDoc is based is saved in the processing device 110.

The attribute data sent from the creation terminal 102 to the processing device 110 in step (2)-1 includes information set on the setting screens described above, such as destination information (a list of users and a list of viewing terminals), access privilege information, an offline expiration period, and original data information.

Figure 8:
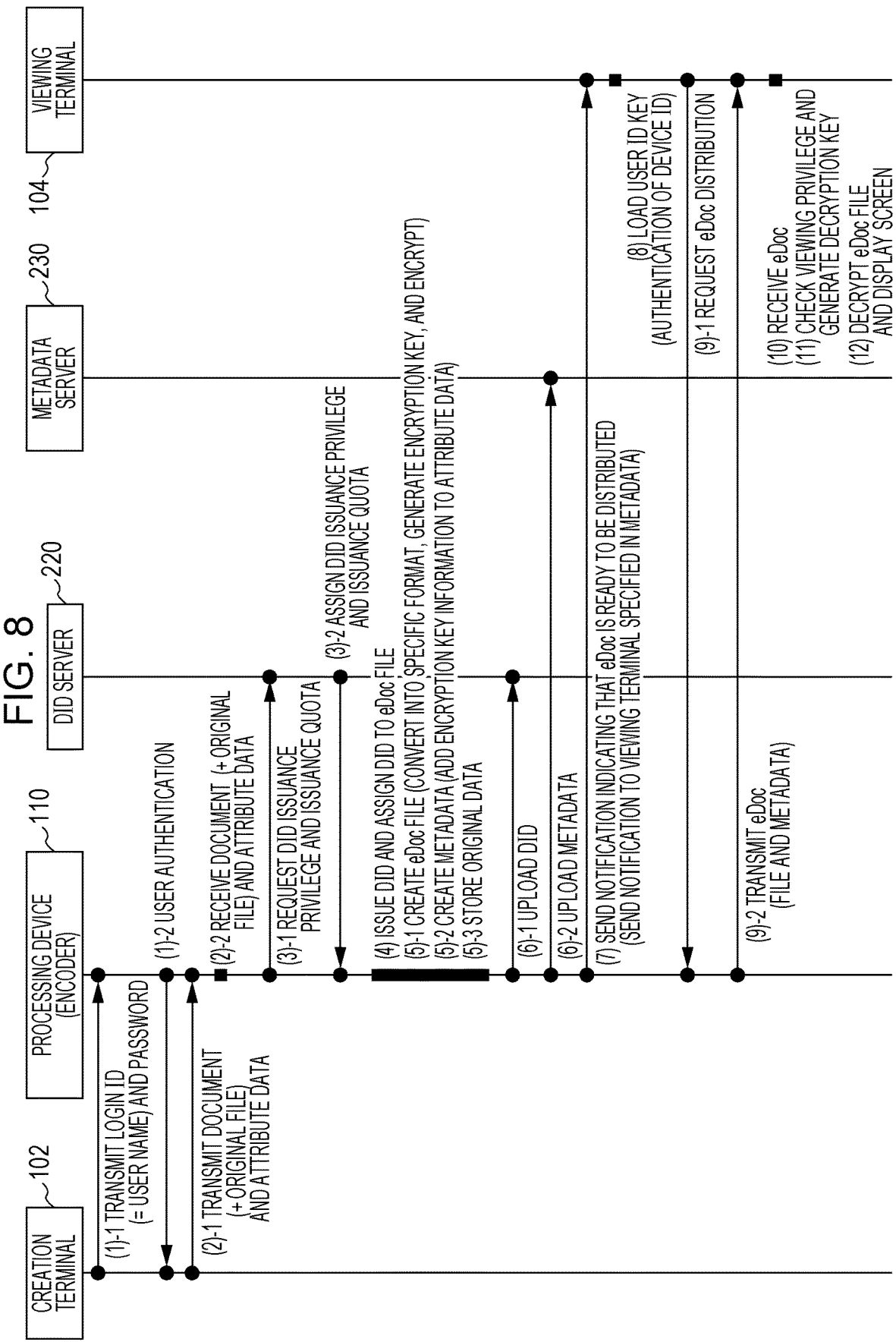
FIG. 8 illustrates a flow of document distribution and viewing in the document management system.

The description now returns to FIG. 8.

(2)-2: The processing device 110 receives the document (referred to as the target document) and the attribute data from the creation terminal 102.

(3)-1: If the processing device 110 has received no DID issuance privilege or issuance quota (or if the received issuance quota has been used up), the processing device 110 requests the DID server 220 in the management system 200 to assign a new issuance privilege and issuance quota. If the received issuance quota has not been used up, the processing device 110 does not make this request and the process proceeds to step (4).

(3)-2: In response to the request from the processing device 110, the DID server 220 transmits a new issuance privilege and issuance quota to the processing device 110.

(4) The processing device 110 issues a DID by using the issuance privilege assigned by the DID server 220 and assigns the DID to an eDoc file generated from the target document (an eDoc file generated in the subsequent step).

(5)-1: The processing device 110 generates an encryption key by using random numbers, for example. The encryption key is used to encrypt the target document. Further, the processing device 110 converts the target document into an eDoc file. That is, the processing device 110 encodes the target document into a format dedicated to the document management system and encrypts the encoded document by using the generated encryption key to generate an eDoc file. Information on the generated DID is included in the generated eDoc file.

(5)-2: The processing device 110 generates metadata of the generated eDoc file. That is, the processing device 110 adds the generated DID, the encoding date and time, the ID of the processing device 110, encryption information, and so on to the attribute data received from the creation terminal 102 to generate metadata (see FIG. 3). The encryption information includes key information on each destination user, which is obtained by encrypting the encryption key used for encryption by using the public key for the destination user.

(5)-3: Upon receipt of an instruction from the creation terminal 102 to store the original data, the processing device 110 saves the document received from the creation terminal 102 (or application data on which the document is based).

(6)-1: The processing device 110 uploads the generated DID to the DID server 220. The DID server 220 stores the DID uploaded from the processing device 110.

(6)-2: The processing device 110 uploads the generated metadata to the metadata server 230. The metadata server 230 stores the metadata uploaded from the processing device 110.

(7) The processing device 110 transmits a distribution preparation completion notification to each of the viewing terminals 104 to which the generated eDoc is to be distributed. The notification indicates that the eDoc is ready to be distributed. The notification includes the generated DID and information indicating the document name of the eDoc. The notification may include a thumbnail image of a representative page (a predetermined page such as the first page) of the eDoc.

Figure 11:
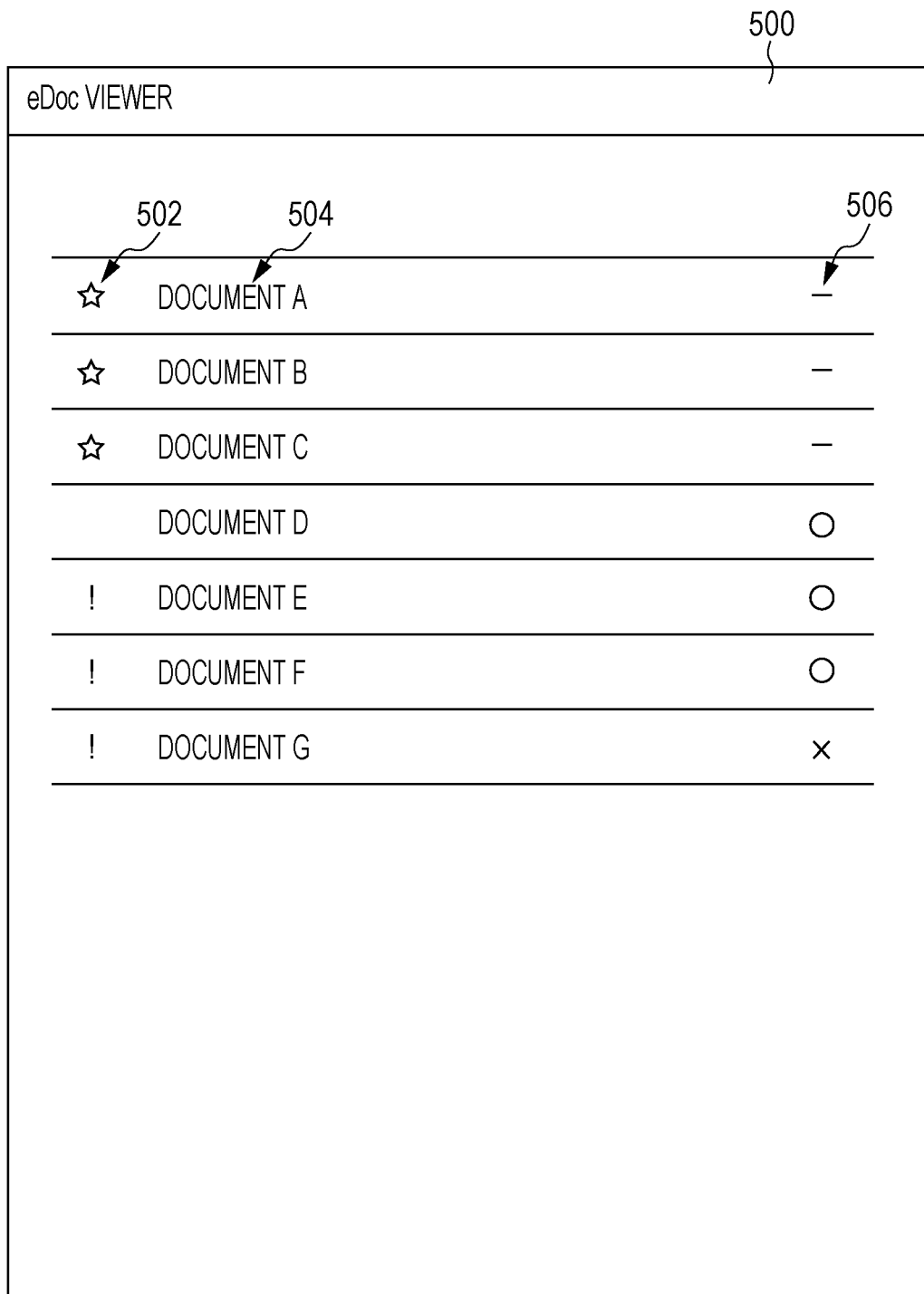
FIG. 11 illustrates an example list screen.

The card reader of the viewing terminal 104 detects (or reads) authentication information stored in the authentication device 130 of a user (referred to as a viewer) who is to use the viewing terminal 104 to authenticate the user. The viewing terminal 104 displays a list screen showing a list of eDocs distributed to the viewing terminal 104. FIG. 11 illustrates an example of a list screen 500. In the illustrated example, the list screen 500 includes, for each eDoc, a notification mark 502, a document name 504 of the eDoc, and a view-permission indication mark 506. The notification mark 502 is a mark used to notify the viewer of the state of the eDoc. Examples of the state of the eDoc indicated by the notification mark 502 include "recently added", "normal", and "expired". The "recently added" state is a state where a document distributed from the processing device 110 has been received but not opened by the viewer. In FIG. 11, an eDoc in this state is marked with a hollow star ("☆"). In FIG. 11, an eDoc in the "normal" state is not given any mark. The "expired" state is a state where access to the document has expired. In FIG. 11, an eDoc in the "expired" state is marked with an exclamation mark ("!"). An eDoc in the "expired" state is not viewable until the most recent metadata of the eDoc is acquired from the processing device 110 or the management system 200 even if the eDoc file has been saved in the viewing terminal 104. An eDoc in the "normal" state is viewable even if the viewing terminal 104 is being disconnected from the processing device 110 or the management system 200 since access to the metadata of the eDoc saved (cached) in the viewing terminal 104 has not expired. The view-permission indication mark 506 indicates whether the combination of the viewing terminal 104 and the user (authenticated by the authentication device 130) who is using the viewing terminal 104 matches a combination of a destination user of the eDoc and the viewing terminal 104 that is specified in the metadata of the eDoc cached in the viewing terminal 104. If a match is found, the eDoc is viewable (a circle mark ("○") is given in FIG. 11). If no match is found, the eDoc is not viewable (a cross ("x") is given in FIG. 11). An eDoc for which a distribution preparation completion notification has been received but neither the eDoc file nor the metadata has been received is marked with an em-dash ("-") as the view-permission indication mark 506 indicating an undetermined state since the viewing terminal 104 does not have information on criteria for determining whether the combination of destinations is satisfied. In the illustrated example, the first three eDocs from the top are recently-added documents, whose eDoc bodies (files and metadata) have not been acquired, and are marked with the view-permission indication mark 506 indicating the undetermined state.

On the list screen (FIG. 11), the viewer selects the desired eDoc by touching it, for example, and makes an instruction to view the eDoc. It is assumed here that a recently-added eDoc (marked with a hollow star ("☆") as the notification mark 502) is selected as a target to be viewed.

(8) The description now returns to FIG. 8. The viewing terminal 104 acquires the eDoc file and the metadata of the selected target to be viewed from the processing device 110 since none of them is held in the viewing terminal 104. Thus, the viewing terminal 104 transmits a user ID key that is authentication information acquired from the authentication device 130 of the viewer to the processing device 110 on the local network 108 to which the viewing terminal 104 is connected. The processing device 110 verifies whether the user ID key verifies the identity of any of the users registered therein (user authentication). It is assumed here that the user authentication is successful. If the user ID key received from the viewing terminal 104 does not verify the identity of any of the users registered in the processing device 110, the processing device 110 may send the user ID key to a higher-level device related to user authentication (the user ID server 210 or the local user ID server 152) and request the higher-level device to perform user authentication.

(9)-1: In response to successful user authentication at the processing device 110, the viewing terminal 104 sends a distribution request including the DID of the eDoc to be viewed, which is selected by the viewer, to the processing device 110.

(9)-2: The processing device 110 returns the eDoc file and metadata corresponding to the DID included in the distribution request sent from the viewing terminal 104 to the viewing terminal 104.

(10) The viewing terminal 104 receives the eDoc file and metadata sent from the processing device 110 and saves (caches) the received eDoc file and metadata.

(11) The viewing terminal 104 determines whether the combination of the viewing terminal 104 and the viewer who is currently using the viewing terminal 104 matches any of combinations of destination users and destination terminals indicated by the destination information in the metadata (see FIG. 3). If the combination does not match any of the combinations, the viewer is not allowed to view the eDoc file on the viewing terminal 104. In this case, the viewing terminal 104 displays an error message indicating that the eDoc file is not viewable. In this case, the viewing terminal 104 may delete the saved eDoc file (and the corresponding metadata). If it is determined that the combination of the viewing terminal 104 and the viewer who is currently using the viewing terminal 104 matches any of the combinations specified in the distributor information in the metadata, the viewing terminal 104 permits the viewer to view the eDoc.

In this case, the viewing terminal 104 retrieves the key corresponding to the viewer from among the encrypted keys corresponding to the destination users included in the encryption information in the metadata and decrypts the retrieved key by using the secret key for the viewer (which is held by the authentication device 130, for example) to restore a decryption key necessary to decrypt the eDoc file.

(12) The viewing terminal 104 decrypts the eDoc file by using the restored decryption key to reproduce a viewable document, and outputs the document (for example, displays the document on the screen). Further, the viewing terminal 104 controls whether to accept from the viewer an instruction to perform an operation on the document, in accordance with the access privilege information included in the metadata. Fundamentally, the viewing terminal 104 does not save the decrypted document in a file. That is, after the document has been viewed, the eDoc file and the metadata are saved but the decrypted document is not saved in a non-volatile storage device of the viewing terminal 104.

Next, another example of the document management system according to this exemplary embodiment will be described with reference to FIG. 12. In the example illustrated in FIG. 12, multiple local systems 100 are located in an in-house network that is a private network in an organization such as an enterprise. An in-house management system 150 is also located in the in-house network. The in-house management system 150 manages processes performed within the organization among processes performed in the document management system and also manages information necessary for the processes. That is, the management system 200 is run by the service provider of the document management system and manages information and processes for multiple organizations that use the document management system, whereas the in-house management system 150 manages part of the information and processes which is related to the organization under management of the management system 200.

The in-house management system 150 includes a local user ID server 152, a local DID server 154, and a local metadata server 156.

The local user ID server 152 manages information on users registered as users in the document management system among the members of the organization. The information on individual users held by the local user ID server 152 is similar to the information on general users held by the user ID server 210 illustrated in FIG. 4. When a user who acquires and uses the processing device 110 (i.e., a user for which the processing device 110 is designated as the "prescribed processing device") is registered in the processing device 110, the processing device 110 sends information on the registered user to the local user ID server 152 within the organization. The local user ID server 152 saves the received information on the user and sends the information to the user ID server 210 of the central management system 200 via the wide area network 10. The user ID server 210 stores the received information on the user. If the information on the user registered in the processing device 110 is changed, the administrator or any other person causes the processing device 110 to change the information on the user. The processing device 110 transmits information on the changed content of the user information (including the user ID, the name of an item whose information is changed, and the changed value of the item, for example) to the local user ID server 152, and the local user ID server 152 changes the information on the user stored therein in accordance with the received changed content. Further, the local user ID server 152 sends information on the received changed content to the user ID server 210, and the user ID server 210 changes the held information on the user in accordance with the sent information.

The local DID server 154 receives and stores a DID issued by each of the processing devices 110 in the local systems 100 belonging to the in-house network within the organization. The information held by the local DID server 154 is similar to the information held by the DID server 220 illustrated in FIG. 5. Further, the local DID server 154 sends information on the DID received from the processing device 110 to the DID server 220, and the DID server 220 stores the information. Further, the local DID server 154 is assigned a DID issuance privilege and issuance quota by the DID server 220 and assigns a DID issuance privilege and issuance quota to each of processing devices 110 managed by the local DID server 154 within the issuance quota on the basis of the issuance privilege.

The local metadata server 156 receives and stores metadata of eDocs generated by the processing devices 110 in the local systems 100 belonging to the in-house network within the organization. The information held by the local metadata server 156 is similar to the information held by the metadata server 230. Further, the local metadata server 156 further sends the metadata received from the processing devices 110 to the metadata server 230, and the metadata server 230 stores the metadata.

Figure 12:
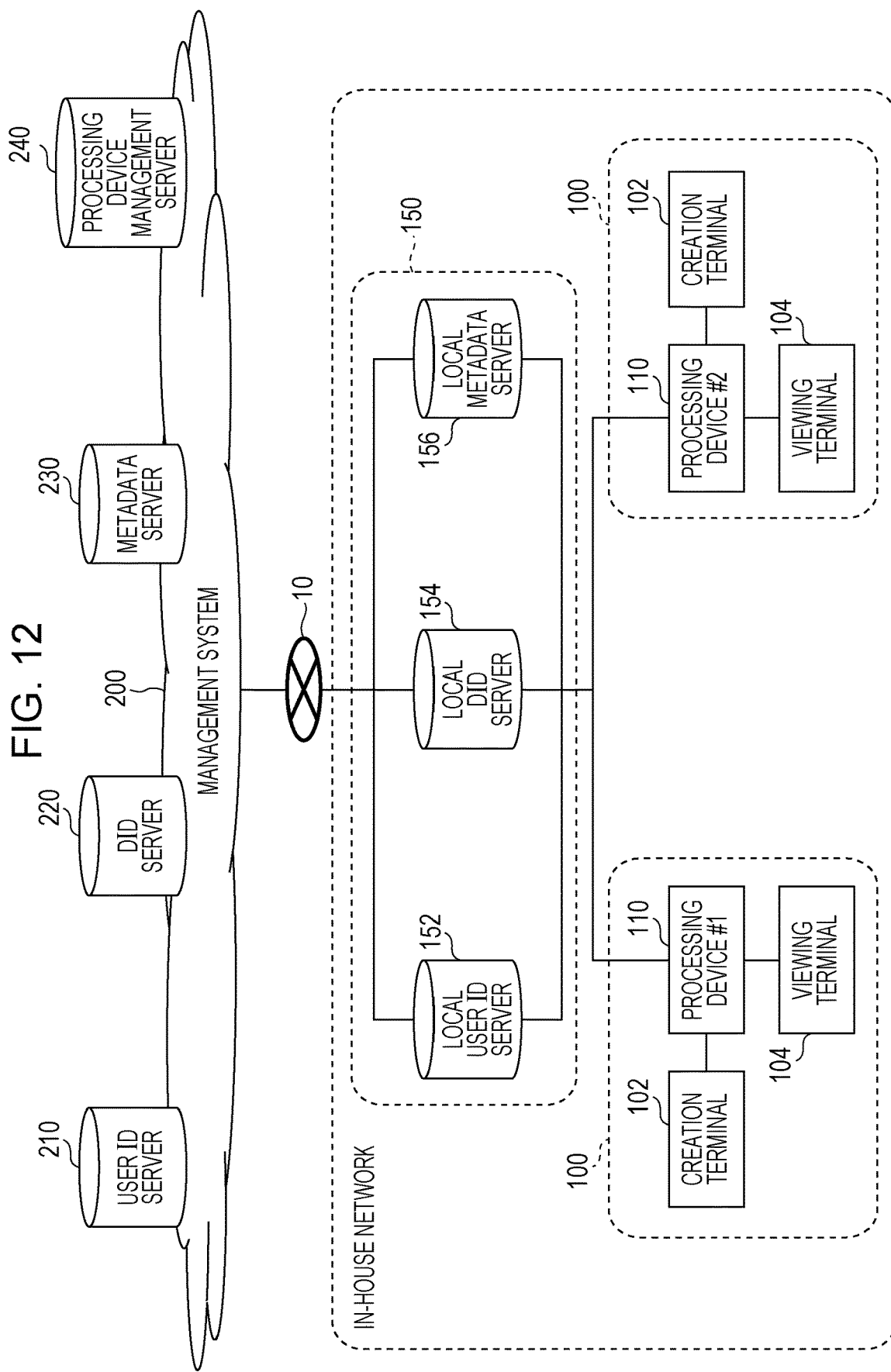
FIG. 12 illustrates an example system configuration including an in-house management system.

In the system illustrated in FIG. 12, upon receipt of a request from a user who has not been registered but has been registered in other processing devices 110 within the same organization, such as a request for registering (and distributing) a document or a request for acquiring an eDoc file or metadata, the processing device 110 responds to the request via the in-house management system 150.

Figure 13:
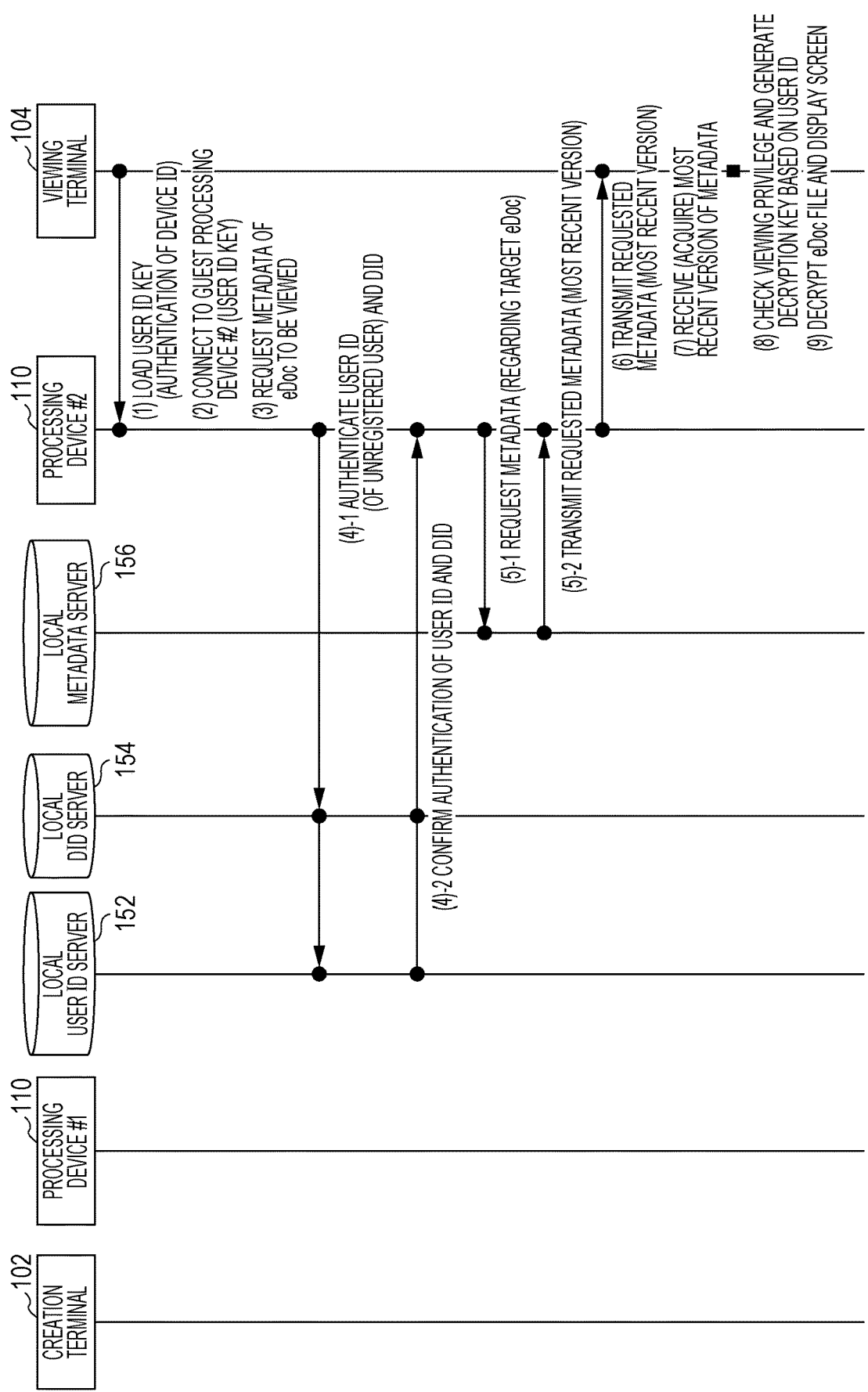
FIG. 13 illustrates an example process flow for a user to acquire metadata of a document and view the document by using a processing device in which the user is not registered.

In an example, a viewer who has been registered in a processing device #1 in a first local system 100 within a first department on the in-house network desires to save an eDoc registered and distributed from the processing device #1 in their viewing terminal 104 and to then move to a second department managed by a processing device #2 to view the eDoc. At this point in time, the metadata of the eDoc saved in the viewing terminal 104 is old (i.e., access to the eDoc has expired). In this case, in response to an operation performed by the viewer to open the eDoc on the viewing terminal 104, a process illustrated in FIG. 13 is performed.

First, the viewing terminal 104 searches for a processing device 110 on the local network 108 in a second local system 100 to which the viewing terminal 104 is being connected. As a result, the processing device #2 is found. The processing device #2, which is different from the processing device #1 that has distributed the eDoc, does not include the eDoc file or the metadata.

(1) The viewing terminal 104 loads a user ID key (authentication information) from the authentication device 130 of the viewer.

(2) The viewing terminal 104 transmits the user ID key acquired from the authentication device 130 to the processing device #2 for user authentication to acquire the most recent metadata of the eDoc designated as the target to be viewed.

(3) The viewing terminal 104 requests the processing device #2 to transmit the metadata of the eDoc. The request includes the DID of the eDoc.

(4)-1: The processing device #2 checks whether the user ID key received from the viewing terminal 104 corresponds to any of the users registered therein (user authentication). In this example, the viewer has been registered in the processing device #1 but has not been registered in the processing device #2. Thus, the processing device #2 sends an authentication request including the user ID key to a preset address of the local user ID server 152. The processing device #2 further sends the DID included in the metadata request sent from the viewing terminal 104 to a preset address of the local DID server 154 for authentication.

(4)-2: The local user ID server 152 verifies whether the user ID key received from the processing device #2 corresponds to any of the users registered therein (user authentication). The viewer who possesses the user ID key has been registered in the processing device #1 and thus has also been registered as a user in the local user ID server 152, which is a higher-level device of the processing device #1. Therefore, the user authentication is successful. The local user ID server 152 returns a response indicating that the authentication is successful to the processing device #2.

The local DID server 154 checks whether the DID to be verified, which is sent from the viewing terminal 104, is an authorized DID, that is, whether the DID to be verified matches any of the DIDs saved therein. In this example, the DID of the eDoc has been issued by the processing device #1 and has also been saved in the local DID server 154, which is a higher-level device of the processing device #1 concerning the DID. Therefore, the DID is authenticated as being authorized. The local DID server 154 returns a response indicating that the DID is authenticated as being authorized to the processing device #2.

(5)-1: Since the user authentication and the DID authentication are successful, the processing device #2 continues a process for responding to the metadata request from the viewing terminal 104. That is, the processing device #2 sends the metadata request including the DID to a preset address of the local metadata server 156.

(5)-2: Upon receipt of the metadata request from the processing device #2, the local metadata server 156 returns the metadata corresponding to the DID included in the request to the processing device #2. When the metadata of the eDoc is changed by the distributor on the processing device 110, the change is immediately reflected in the corresponding metadata held by the local metadata server 156. Thus, the metadata returned to the processing device #2 at this time is the most recent version of the metadata of the eDoc to be viewed.

(6) The processing device #2 transmits the metadata received from the local metadata server 156 to the viewing terminal 104.

(7) The viewing terminal 104 receives the metadata from the processing device #2 and saves (caches) the received metadata.

(8) The viewing terminal 104 refers to the destination information in the received most recent metadata and checks for privilege for the combination of the viewing terminal 104 and the viewer. That is, if the combination of the viewing terminal 104 and the viewer matches any of combinations of destination users and destination terminals indicated by the destination information (see FIG. 3), the viewing terminal 104 determines that the viewing privilege exists. Otherwise, the viewing terminal 104 determines that the viewing privilege does not exist. If it is determined that the viewing privilege does not exist, the viewing terminal 104 provides an error indication. If it is determined that the viewing privilege exists, the viewing terminal 104 retrieves the key corresponding to the viewer from among the encrypted keys corresponding to the destination users included in the encryption information in the metadata and decrypts the retrieved key by using the secret key for the viewer (the secret key is held by the authentication device 130, for example) to restore a decryption key necessary to decrypt the eDoc file.

(9) Then, the viewing terminal 104 decrypts the eDoc file by using the restored decryption key to reproduce a viewable document, and outputs the document (for example, displays the document on the screen). Then, the viewing terminal 104 controls whether to accept from the viewer an instruction to perform an operation on the document, in accordance with the access privilege information included in the metadata.

Next, a process flow when a user registered in the processing device #1 in the first local system 100 goes to a second department managed by the processing device #2 and registers a document in the document management system will be described with reference to FIG. 14. It is assumed that the user (the distributor of the document) has not been registered in the processing device #2.

(1) When the user gives an instruction to their creation terminal 102 to register a document, the creation terminal 102 displays a screen for prompting the user to input login authentication information. When the distributor inputs authentication information (for example, a user ID and a password) in accordance with the request, the creation terminal 102 transmits the authentication information to the processing device #2 via the local network 108.

(2) The processing device #2 determines whether the authentication information received from the creation terminal 102 corresponds to any of the users registered therein. In this case, the distributor has not been registered in the processing device #2. Thus, the processing device #2 sends the authentication information to a higher-level device, namely, the local user ID server 152, for authentication.

(3) The local user ID server 152 determines whether the received authentication information corresponds to any of the users registered therein (user authentication). In this example, the distributor, who is a user registered in the processing device #1, is also a user registered in the local user ID server 152. Therefore, the user authentication is successful. The local user ID server 152 returns information indicating that the user authentication is successful to the processing device #2.

(4) Upon receipt of a response indicating successful authentication from the local user ID server 152, the processing device #2 sends a response indicating that the user authentication is successful to the creation terminal 102.

(5) When the user authentication is successful, the creation terminal 102 sends the document selected by the user as an object to be registered and the attribute data input by the user to the processing device #2.

(6) The processing device #2 receives the document and the attribute data from the creation terminal 102.

(7)-1: If the DID issuance privilege and issuance quota have been used up, the processing device #2 requests the local DID server 154 to assign a new issuance privilege and issuance quota. If the received issuance quota has not been used up, the processing device #2 does not make this request and the process proceeds to step (8).

(7)-2: In response to the request from the processing device #2, the local DID server 154 assigns a new issuance privilege and issuance quota to the processing device #2. If the issuance quota assigned from the DID server 220 has been used up, the local DID server 154 requests the DID server 220 to assign a new issuance privilege and issuance quota. Using an issuance privilege and issuance quota assigned in response to this request, the local DID server 154 assigns a DID issuance right and issuance quota to the processing device #2.

(8) The processing device #2 issues a DID by using the assigned issuance privilege and assigns the DID to an eDoc file generated from the target document (an eDoc file generated in the subsequent step).

(9)-1: The processing device #2 generates an encryption key for encrypting the target document, encodes the target document into a format dedicated to this system, and encrypts the encoded document by using the generated encryption key to generate an eDoc file.

(9)-2: The processing device #2 generates metadata of the eDoc file by adding items such as the generated DID and the encoding date and time to the attribute data received from the creation terminal 102.

(10) The processing device #2 uploads the generated DID to the local DID server 154 and uploads the generated metadata to the local metadata server 156. The local DID server 154 adds the DID uploaded from the processing device #2 to the issued DID list (see FIG. 5) corresponding to the issuance privilege key included in the local DID server 154 and uploads the DID to the DID server 220. The DID server 220 adds the DID uploaded from the local DID server 154 to the issued DID list (see FIG. 5) corresponding to the issuance privilege key. Further, the local metadata server 156 stores the metadata uploaded from the processing device #2 and uploads the metadata to the metadata server 230. The metadata server 230 stores the metadata uploaded from the local metadata server 156.

The processing device #2 distributes the generated eDoc to a destination designated by the distributor. This process is similar to that of steps (7) to (12) in FIG. 8.

(11) Further, the processing device #2 transmits the generated eDoc file and metadata to the creation terminal 102. The processing device #2 may save the eDoc file and the metadata or delete the eDoc file and the metadata without saving them. If the eDoc file and the metadata are not saved but are deleted, the eDoc file and the metadata are saved in only the processing device #1 designated as the prescribed processing device in step (13) described below among the processing devices 110 within the organization. Whether a processing device 110 that is not designated as the prescribed processing device of the distributor saves the eDoc file and the metadata registered and distributed in the request given by the distributor may be set in the processing device 110.

(12) The creation terminal 102 saves the eDoc file and metadata received from the processing device #2 to later transfer them to the processing device #1, which is the prescribed processing device of the distributor.

(13) When the distributor carries the creation terminal 102 and returns to the first department to which the distributor belongs, the creation terminal 102 searches for the processing device #1, which is the prescribed processing device of the distributor, on the local network 108 in the first local system 100. Upon finding the processing device #1, the creation terminal 102 registers the eDoc file and metadata saved in step (12) described above to the processing device #1. Accordingly, the distributor who desires to change the content of the metadata (for example, the destination) may access the prescribed processing device, namely, the processing device #1, and change the metadata.

In the document management system according to this exemplary embodiment described above, the body information (i.e., an eDoc file) of a document that the creation terminal 102 has instructed the processing device 110 to distribute is stored in only the processing device 110 and a destination viewing terminal 104 but is not delivered to other networks or devices. This configuration may minimize the risk of leakage of the eDoc file. In particular, limiting the distribution destination of the eDoc file to the viewing terminal 104 on the local network 108 within which the eDoc has been generated prevents the eDoc from being delivered outside the local network 108.

In contrast, the metadata of the eDoc is registered in the central management system 200 or the in-house management system 150 within each organization and is thus obtainable by the viewing terminal 104 via the wide area network 10 or a private network within the organization even when the viewing terminal 104 moves to various locations. Upon receipt of an instruction from the user to view the eDoc, the viewing terminal 104 acquires the most recent metadata of the eDoc from the in-house management system 150 or the central management system 200 and determines whether to permit the user to view the eDoc on the basis of the destination information included in the most recent metadata. The user who is designated as a destination when the eDoc is registered or distributed is not permitted to view the eDoc if the user is removed from the destination list due to a later change of the destination list.

Figure 14:
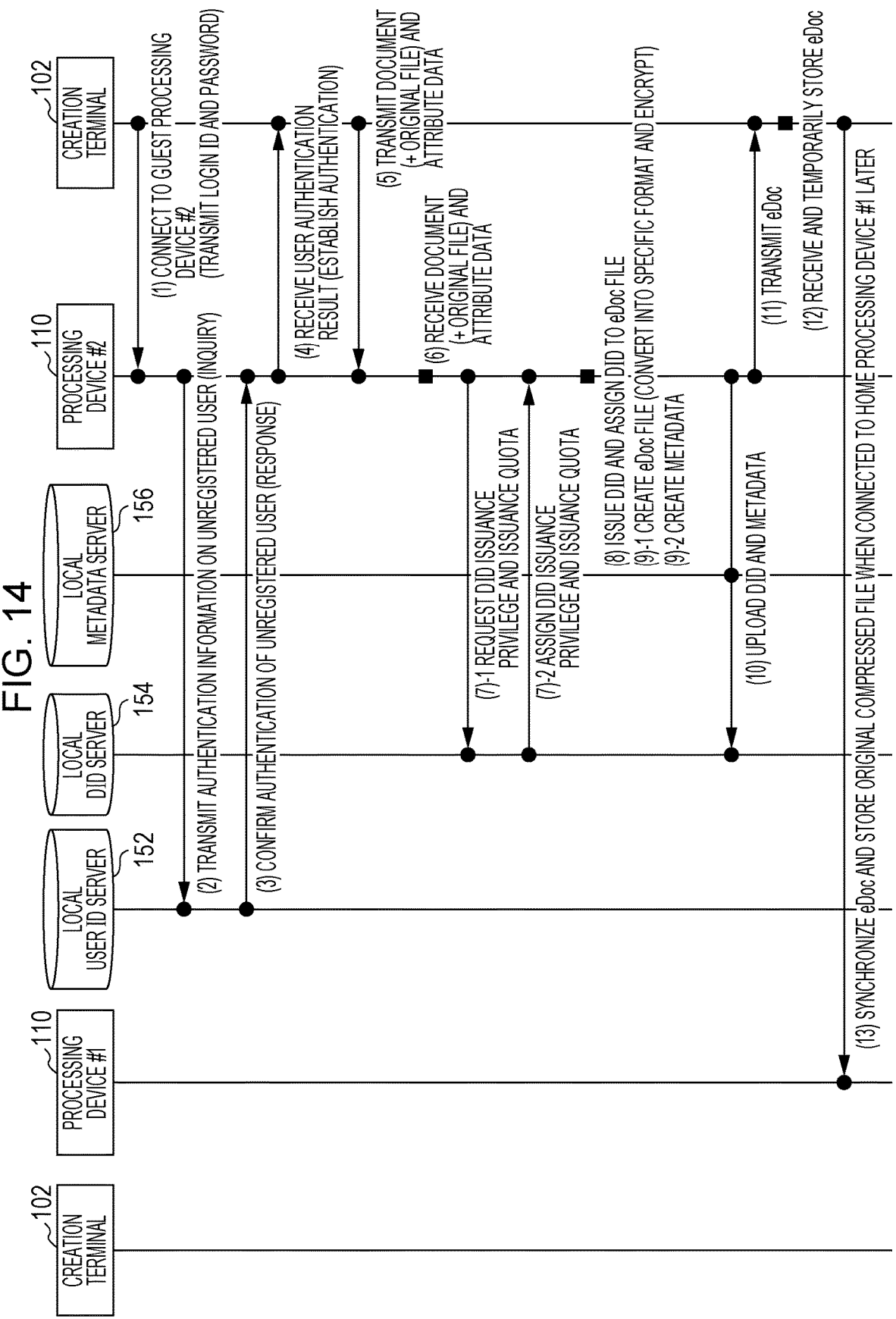
FIG. 14 illustrates an example process flow for a user to register a document in the document management system by using a processing device in which the user is not registered.

In the examples illustrated in FIGS. 13 and 14, the processing device #1 and the processing device #2 are assumed to be placed in the same organization and a destination user is also assumed to belong to the organization. Thus, user authentication is performed by the local user ID server 152 within the organization. If the viewer is a user belonging to an organization different from that in which the processing device #2 is placed, neither the processing device #2 nor the local user ID server 152, which is a higher-level device of the processing device #2, is able to authenticate the distributor. In this case, the user ID server 210, which is a further higher-level device, may perform user authentication on the distributor.

In the examples illustrated in FIGS. 13 and 14, another processing device, namely, the processing device #2, acts as an intermediate device between the viewing terminal 104 of a user registered in the processing device #1 and the local user ID server 152 or the local metadata server 156 to exchange data therebetween. However, this is merely an example. Alternatively, for example, if a user has not been registered in the processing device #2 on the basis of the authentication information on the user which is sent from the viewing terminal 104, the processing device #2 may return a response indicating that authentication is not possible to the viewing terminal 104. In this case, the viewing terminal 104 requests the local user ID server 152 to perform authentication by using registered address information of a higher-level device. If the authentication is successful, the viewing terminal 104 accesses the local metadata server 156 and acquires necessary metadata.

In the example illustrated in FIG. 13, a user moves to a local system 100 managed by a processing device 110 different from their own prescribed processing device within the organization to which the user belongs, and views a document. The user who is located outside the organization to which the user belongs may be able to view a document distributed from their own prescribed processing device. In this case, the viewing terminal 104 of the user is authenticated by the user ID server 210 in the central management system 200 and acquires the metadata of the desired document to be viewed from the metadata server 230.

Example of DID

Next, the configuration of a DID 600 used as information identifying an eDoc in the document management system will be described with reference to FIG. 15.

Figure 15:
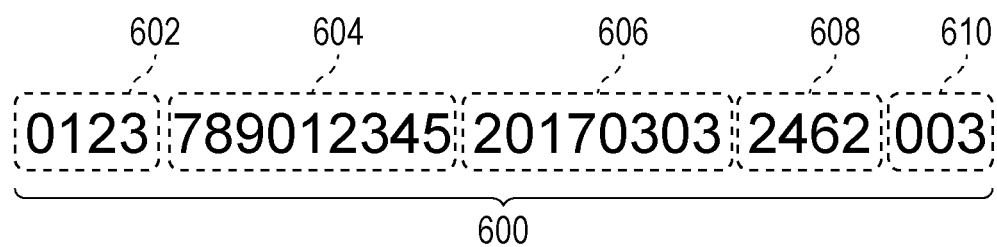
FIG. 15 illustrates an example of the data content of a DID.

As illustrated in FIG. 15, the DID 600 includes an issuance privilege key 602, processing-device-specific information 604, an issuance date 606, an issuance certificate key 608, and an issuance number 610. The numbers of digits in the DID 600 and the elements 602 to 610 illustrated in FIG. 15 are for illustrative purposes only.

The issuance privilege key 602 is key information identifying an issuance privilege assigned to the processing device 110 by the DID server 220. Upon receipt of a request for an issuance privilege and issuance quota from the processing device 110, the DID server 220 generates the issuance privilege key 602 and transmits the issuance privilege key 602 to the processing device 110 together with the value of the issuance quota (for example, up to 100 documents). In a system configuration in which the local DID server 154 is interposed between the DID server 220 and the processing device 110, for example, the DID server 220 collectively assigns multiple sets of issuance privilege keys and issuance quotas to the local DID server 154. This assignment may mean that the DID server 220 requests the local DID server 154 to assign the multiple sets of issuance privilege keys and issuance quotas to the processing device 110. In response to a request for an issuance privilege from the processing device 110 managed by the local DID server 154, the local DID server 154 may assign sets of issuance privilege keys and issuance quotas which have not been assigned to the processing device 110 among the assigned multiple sets of issuance privilege keys and issuance quotas to the processing device 110.

The processing-device-specific information 604 is information specific to the processing device 110 that has issued the DID. That is, the processing-device-specific information 604 in the DID 600 is checked to uniquely identify the processing device 110 that has issued the DID 600. The processing-device-specific information 604 is held by the processing device 110.

The issuance date 606 is a character string, represented as a year/month/day value, indicating the date when the DID 600 was issued. The issuance date of a DID is also the date when an eDoc to which the DID is assigned was generated (encoded).

The issuance certificate key 608 is key information used to prove that the processing device 110 (identified using the processing-device-specific information 604) has issued the DID 600 by using the issuance privilege indicated by the issuance privilege key 602. The issuance certificate key 608 is a value obtained by, for example, encrypting the issuance privilege key 602 by using the secret key for the processing device 110. When a value obtained by decrypting the issuance certificate key 608 by using the public key for the processing device 110 matches the issuance privilege key 602, the DID 600 is proved to have been issued by the processing device 110 by using the issuance privilege key 602. Alternatively, the issuance certificate key 608 may be a value obtained by encrypting the value of a portion of the DID 600 other than the issuance privilege key 602 (or a hash value indicating a predetermined number of digits generated from this value) by using the secret key for the processing device 110. In this case, unless a value obtained by decrypting the issuance certificate key 608 by using the public key for the processing device 110 is inconsistent with the value of the portion of the DID 600 other than the issuance certificate key 608 (for example, if a value obtained as a result of decryption matches the hash value of the value), it is proved that the DID 600 has been issued by the processing device 110 on the basis of the issuance privilege key 602 and that the portion of the DID 600 other than the issuance certificate key 608 is not tampered with.

The issuance number 610 is a serial number indicating the ordinal number of the DID 600 among the DIDs issued by the processing device 110 by using the issuance privilege key 602. A maximum value that can be taken by an issuance number 610 of a DID 600 generated using a certain issuance privilege key 602 is equal to the value of the issuance quota (the number of documents) assigned by the DID server 220 (or the local DID server 154) together with the issuance privilege key 602.

Change of Destinations after Registration

After an eDoc is registered in the document management system, the distributor (or any other person who is given the privilege to change a destination list) may desire to add or delete a destination or modify the privilege to access the eDoc which is granted to the destinations. In this case, for example, the distributor accesses the prescribed processing device 110 by using the creation terminal 102 or the viewing terminal 104 (hereinafter collectively referred to as the user terminal), specifies the DID of the target eDoc, and issues an instruction to edit the destination list (or the access privilege).

Upon receipt of the instruction, the processing device 110 provides an editing screen for editing the destination list and the access privilege to the user terminal if the user who has issued the instruction is verified as being a distributor or any other person authorized for the target eDoc through user authentication. The term "distributor or any other person" collectively refers to a distributor and any other person given the privilege to change the destinations. The editing screen may be similar to the input screen 400 illustrated in FIG. 9. The distributor or any other person adds or deletes a destination user and viewing terminal or changes the content of the access privilege on the editing screen. When the distributor or any other person makes a necessary change on the editing screen and then performs an operation of confirming the change, the processing device 110 reflects the change in the metadata of the eDoc saved therein and reports the changed content to the local metadata server 156 and the metadata server 230, which are higher-level devices of the processing device 110. The local metadata server 156 and the metadata server 230 reflect the reported changed content in the saved metadata of the eDoc. For example, even a user who is designated as the destination when an eDoc is distributed may not be able to view the eDoc if the user is removed from the destination list due to a later change. In response to a change of the destination information in the metadata of the eDoc in the way described above, the processing device 110 may send an instruction to a destination viewing terminal 104 that has been included in the destination information before the change but is not included in the destination information after the change to delete the eDoc file (and the corresponding metadata).

In the example described above, the processing device 110 accepts an instruction to change the destinations of an eDoc or the access privilege. Alternatively or additionally, a higher-level device, that is, the management system 200 (the metadata server 230) or the in-house management system 150 (the local metadata server 156), may accept the change instruction. In this case, the higher-level device transmits new metadata changed in accordance with the change instruction to the processing device 110 that has generated the eDoc (and to the local metadata server 156 within the organization to which the processing device 110 belongs) to replace the existing metadata stored in the processing device 110 with the new metadata.

Management of Status of Processing Device

Next, control based on management of the status of the processing device 110 will be described.

The processing device 110 periodically reports its status to the management system 200. In the management system 200, the processing device management server 240 adds the received status to the status history 242 of the processing device 110 in association with the date and time of receipt of the status. Further, the processing device management server 240 checks the received status and controls whether it is possible to provide services to users of the processing device 110 on the basis of the check result.

Figure 6:
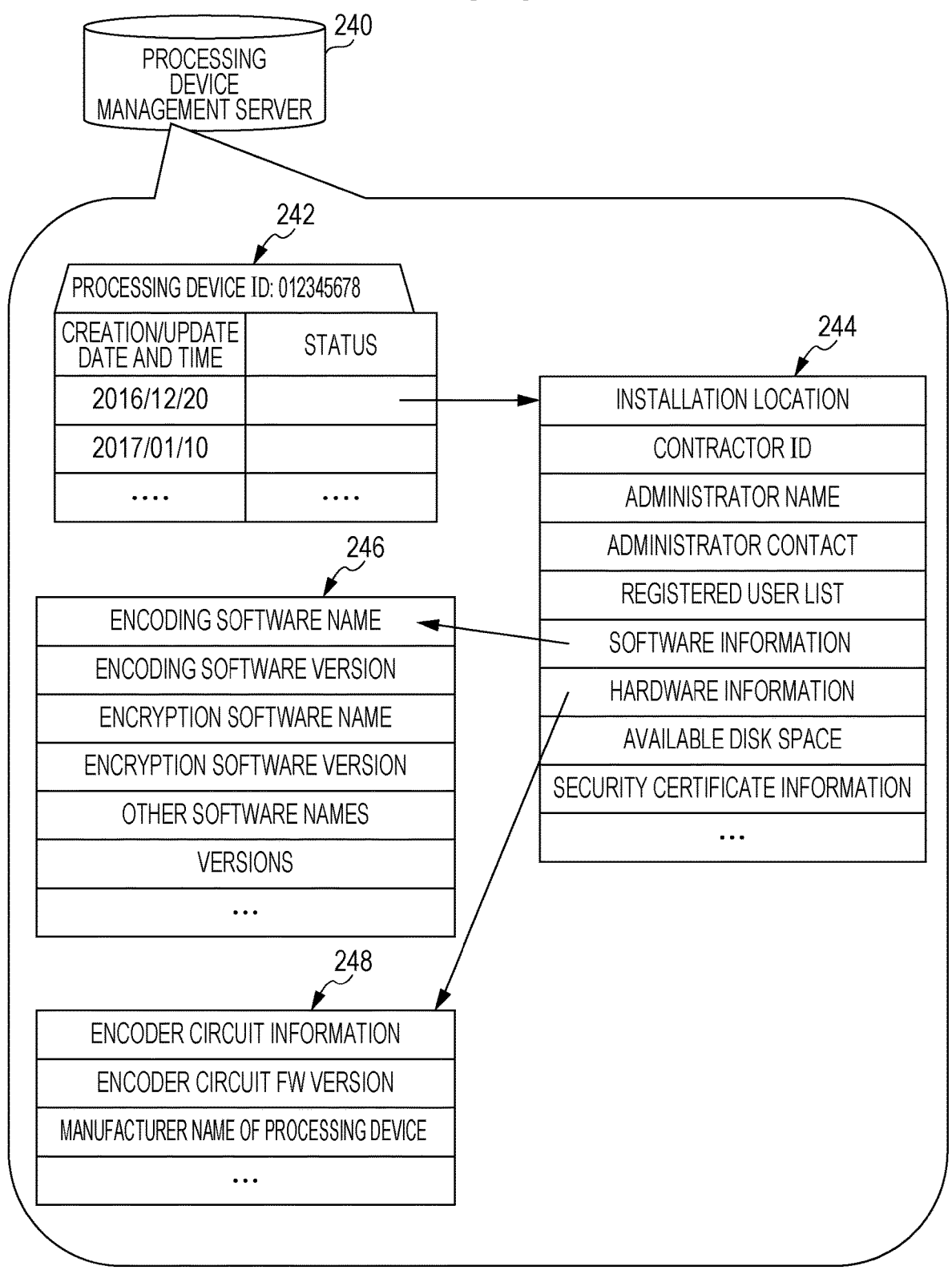
FIG. 6 exemplarily illustrates data content managed by a processing device management server.

The status periodically transmitted from the processing device 110 to the processing device management server 240 includes items similar to those in the status 244 of the processing device 110 exemplarily illustrated in FIG. 6. Note that items of the status 244 that may not be changed by the processing device 110, such as the installation location, the encoder circuit information, and the manufacturer name of the processing device 110, may not be periodically transmitted.

Figure 16:
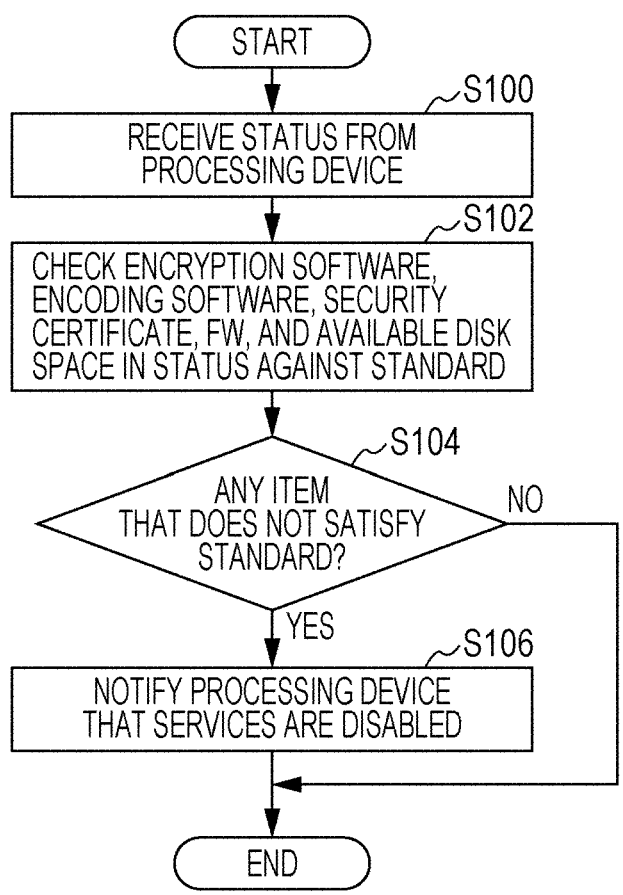
FIG. 16 is a flowchart exemplarily illustrating a processing device status check process performed by the processing device management server.

The processing device management server 240 executes, for example, a process exemplarily illustrated in FIG. 16 on the basis of the status sent from the processing device 110.

First, upon receipt of a status from the processing device 110 (S100), the processing device management server 240 checks the values of the items to be examined in the status against the respective standards of the items (S102). The items to be examined include the name and version of encryption software, the name and version of encoding software, security certificates installed in the processing device 110, information on encryption keys (used for purposes such as communication path encryption or signature, for example, a pair of secret key and public key) installed in the processing device 110, such as identification information of the keys and the date and time of installation of the keys, the name of the encoder circuit, the version of the firmware (FW), installed font types, and the available space of the disk (secondary storage). Examples of the standards of the individual items are that: the versions of the encryption software, the encoding software, and the firmware are most recent (or are more recent than a certain version), the available space of the disk is greater than or equal to a predetermined threshold, the installed security certificate does not include a blacklisted certificate, a predetermined period has not elapsed since the date of installation of the encryption key for the processing device 110, and predetermined types of fonts are installed.

For example, it is desirable that an encryption key used by the processing device 110 for communication path encryption, signature, or the like be periodically changed to a new key in order to maintain the safety. Thus, an encryption key for which a predetermined period has elapsed since the date and time of installation is determined not to satisfy the standard, and provision of services is not allowed (or a warning indicating that provision of services will not be allowed is issued). The exchange for a new key is encouraged.

Then, the processing device management server 240 determines whether the items to be examined in the status received from the processing device 110 include an item that does not satisfy the standard (S104). If all the items to be examined satisfy the respective standards, the process ends for the processing device 110 for which the status is currently received. If it is determined in S104 that an item that does not satisfy the standard is found, the processing device management server 240 notifies the processing device 110 that services are disabled (S106). Upon receipt of this notification, the processing device 110 stops the service for registration (distribution) of a document to the document management system according to this exemplary embodiment. That is, the processing device 110 does not accept a request from the creation terminal 102 to register (distribute) a document, and returns a message indicating that services are not currently available.

This control may reduce the risk of the processing device 110 generating an eDoc whose quality does not satisfy the standards. For example, this control allows provision of services to the processing device 110 to be stopped before an eDoc is generated through insufficiently strong encryption with old encryption software. In addition, services do not become available before such an event occurs as leakage of documents due to an error in the eDoc generation process because of low available disk space or old firmware. Furthermore, services do not become available before a reduction in the image quality of an eDoc file caused by replacing a predetermined font in a document with a different font and encoding the document by a processing device 110 that does not have the font. Other events are also less likely to occur such as limitations on the image size of eDoc files because the image size of documents supported by the most recent firmware is not supported due to the old firmware of the encoder circuit.

The items to be examined in the status may be classified into an item that affects eDoc security and an item that does not affect eDoc security, and the processing device 110 may be made to stop services only when the former item does not satisfy the standard. When the latter item does not satisfy the standard, the processing device 110 or the administrator of the processing device 110 is provided with a warning and is encouraged to address the problem regarding the item. In response to the warning, the administrator of the processing device 110 repairs the processing device 110 in terms of an item for which they can address the problem without help of any expert technician, and otherwise asks the system operator to dispatch a maintenance person. If a specific item among the items to be examined is found not to satisfy the standard, the processing device management server 240 may automatically arrange dispatch of a maintenance person to the processing device 110.

A modification of the process illustrated in FIG. 16 will be described with reference to FIG. 17.

Figure 17:
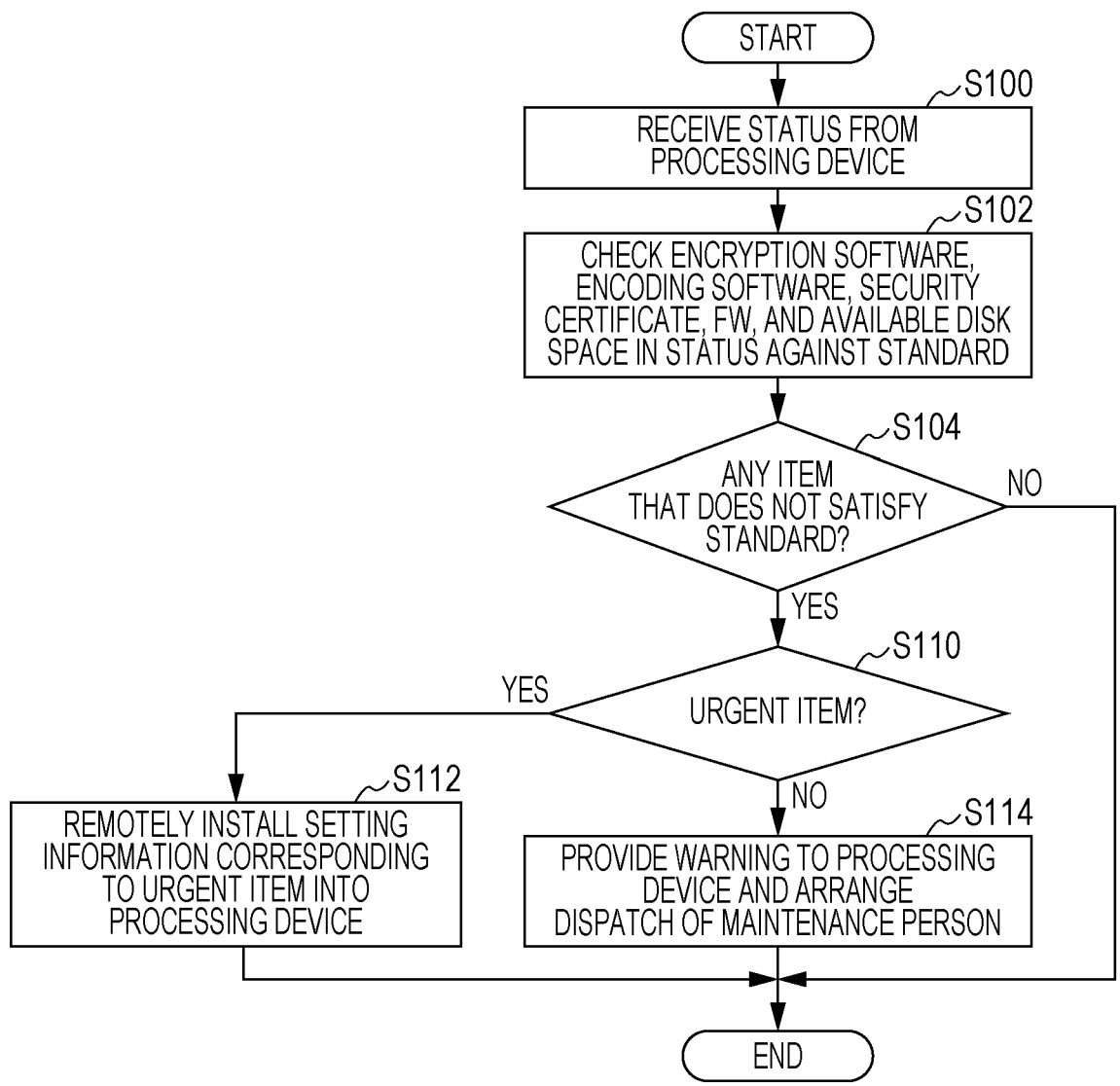
FIG. 17 is a flowchart illustrating another example of the processing device status check process performed by the processing device management server.

In the procedure illustrated in FIG. 17, the items to be examined in the status of the processing device 110 are divided based on another criterion, namely, urgency. An urgent item is an item that greatly affects the quality of an eDoc generated by the processing device 110 in terms of security or that greatly affects the security of the document management system. Sufficient safety may not be ensured for an eDoc generated by a processing device 110 having an urgent item that does not satisfy the standard, or if a processing device 110 having an urgent item that does not satisfy the standard is continuously in operation, the processing device 110 will introduce a security hole (vulnerability) into the document management system. Examples of the urgent item include an encryption software version, security certificates installed in the processing device 110, and discovery of vulnerability in encryption keys installed in the processing device 110.

One method for avoiding a problem caused by an urgent item that does not satisfy the standard is to deactivate a processing device 110 for which an urgent item does not satisfy the standard, dispatch a maintenance person, and correct or repair the processing device 110 for the urgent item. In this case, the user is not able to use the processing device 110 until the correction is completed, which may inconvenience the user.

In the procedure illustrated in FIG. 17, accordingly, if an item that does not satisfy the standard is found in S104, the processing device management server 240 determines whether the found item is an urgent item (S110). If the item is an urgent item, the processing device management server 240 remotely installs setting information for correcting the problem regarding the urgent item into the processing device 110 from the processing device management server 240 via the wide area network 10 (S112). Examples of the setting information for correcting a problem regarding an urgent item include the most recent version of encryption software, the vulnerability-addressed most recent version of a security certificate having an older version in which vulnerability is found, and a new key pair that replaces the pair of secret key and public key for the processing device 110 in which vulnerability is found.

For example, to remotely install a new key pair, the processing device management server 240 prepares a phrase to generate the new key pair, generates a key pair by using the phrase, and transmits the generated key pair to the processing device 110 by using a secure method to remotely install the key pair.

Accordingly, the urgent item that does not satisfy the standard for the processing device 110 is updated into the one that satisfies the standard by using the setting information. In response to this update, the value of the urgent item in the status of the processing device 110, which is stored in the processing device management server 240, is updated.

If the determination result is NO in S110 (if the item is not an urgent item), the processing device management server 240 sends a warning indicating an item that does not satisfy the standard to the processing device 110 or the administrator and arranges dispatch of a maintenance person to the processing device 110 for correction regarding the item (S114). An item that is not an urgent item may be less likely to cause a serious security problem if the processing device 110 is continuously in operation, and a measure is taken by dispatching a maintenance person instead of deactivating the processing device 110. Since the processing device management server 240 does not need to remotely install setting information for items other than urgent items, an increase in the load on the processing device management server 240 may be avoided.

In the example illustrated in FIG. 17, setting information on an urgent item is installed top-down from the processing device management server 240 to the processing device 110. Accordingly, the setting information is installed into the processing device 110 and the value of the urgent item in the status of the processing device 110 is updated. For an item other than urgent items in the status, in contrast, for example, a maintenance person sets or changes the value of the item and installs setting information (for example, the most recent version of encryption software) on the item into each of the processing devices 110. The setting or change of the value of the item in the status which is performed in the processing device 110 is reported to a higher-level device, namely, the processing device management server 240, and, in response to this report, the processing device management server 240 changes the value of the corresponding item in the status of the processing device 110 which is stored in the processing device management server 240.

DID Verification

Upon receipt of a notification of a DID issued by the processing device 110, a request for metadata (this request includes a DID) from the viewing terminal 104, or a request from a user or any other person to verify a DID, the management system 200 verifies whether the DID is correct.

In this case, the DID server 220 verifies the target DID 600 (see FIG. 15) in terms of the following points.

(a) Consistency is found between the issuance privilege key 602 and the processing-device-specific information 604 in the DID 600.

The DID server 220 checks whether the information (see FIG. 5) recorded thereon includes the issuance privilege key 602 as an issuance privilege key to be assigned to the processing device 110 identified by the processing-device-specific information 604. If the issuance privilege key 602 is not included, the issuance privilege key 602 has not been issued to the processing device 110 identified by the processing-device-specific information 604. Thus, both are inconsistent. In this case, the DID 600 is an unauthorized DID.

(b) Consistency is found between the issuance privilege key 602 and the issuance date 606 in the DID 600.

The DID server 220 has recorded thereon, in association with an issuance privilege key, the key assignment date and time and the key termination date and time (see FIG. 5). When the issuance date 606 in the DID 600 is outside the period from the key assignment date and time to the key termination date and time recorded in association with the issuance privilege key 602 in the DID 600, inconsistency is found between the issuance privilege key 602 and the issuance date 606. In this case, the DID 600 is an unauthorized DID.

(c) Consistency is found among the issuance privilege key 602, the processing-device-specific information 604, and the issuance certificate key 608 in the DID 600.

The DID server 220 decrypts the issuance certificate key 608 by using the public key for the processing device 110 identified by the processing-device-specific information 604 and determines whether the issuance certificate key obtained as a result of the decryption matches the issuance certificate key 608 in the DID 600. If no match is found, these three elements are inconsistent and the DID 600 is therefore found to be unauthorized.

(d) The issuance number 610 in the DID 600 is consistent with the issuance quota corresponding to the issuance privilege key 602.

The DID server 220 has recorded thereon the issuance quota assigned to the processing device 110 together with the issuance privilege key 602 (see FIG. 5). When the issuance number 610 in the DID 600 is larger than the value specified in the issuance quota recorded in association with the issuance privilege key 602, the corresponding DID is an unauthorized DID.

(e) The issuance number 610 in the DID 600 is consistent with the issuance number of the issued DID including the same issuance privilege key as the issuance privilege key 602 in the DID 600. This standard is used for, upon receipt of a notification of a newly issued DID from the processing device 110, verification of whether the DID is inconsistent with the already issued DID.

The DID server 220 has recorded thereon, in association with an issuance privilege key, a DID issued using the issuance privilege key and information on the date and time of issuance (the issued DID list in FIG. 5). The DID server 220 checks whether issued DIDs having the same issuance privilege key as the issuance privilege key 602 in the DID 600 to be verified include a DID having the same issuance number as the issuance number 610 in the DID 600. If such a DID is included, the DID 600 is determined to be unauthorized.

(f) The combination of the issuance date 606 and the issuance number 610 in the DID 600 is consistent with the combination of the issuance date and issuance number of an issued DID including the same issuance privilege key as the issuance privilege key 602 in the DID 600.

The DID server 220 determines whether the combination of the issuance date 606 and the issuance number 610 in the DID 600 to be verified is inconsistent with the combination of the issuance date and issuance number of an individual issued DID including the same issuance privilege key as the issuance privilege key 602 in the DID 600, that is, whether there are combinations in which the order of the two issuance dates (chronological or ascending order) and the order of the two issuance numbers (descending order) are opposite. For example, if an issued DID whose issuance date is later than that of the DID 600 and whose issuance number is smaller than that of the DID 600 is found, inconsistency is found between the DID 600 and the found issued DID, that is, the orders are opposite. If such inconsistency is found, only the DID 600 to be verified or both the DID 600 and the issued DID are determined to be unauthorized.

If a certain DID is determined to be unauthorized as a result of verification based on the standards described above, the DID server 220 transmits a warning to the administrator of the processing device 110 related to the unauthorized DID via electronic mail or any other suitable method. The warning includes a message indicating that a DID falsified to be issued by the processing device 110 has been found. In response to the warning, the administrator takes measures to strengthen security. The administrator of the processing device 110 or the contact of the administrator may be obtained from information (see FIG. 6) stored in the processing device management server 240. The processing device 110 related to the unauthorized DID, which is the destination of the warning, is a processing device 110 identified by the processing-device-specific information 604 included in the DID. The warning may be transmitted to a processing device 110 that has previously assigned the same issuance privilege key as the issuance privilege key included in the unauthorized DID.

Process Performed in Response to Discovery of Vulnerability in eDoc Encryption

A process performed in response to the discovery of vulnerability in encryption software used for encryption to generate an eDoc file will now be described. If the operator of the document management system finds the discovery of vulnerability in a specific version of encryption software used by any of the processing devices 110, the management system 200 transmits a vulnerability notification to each of the processing devices 110. The vulnerability notification includes information on the name and version of encryption software in which vulnerability has been discovered. When the in-house management system 150 is present, the vulnerability notification is passed from the management system 200 to the in-house management system 150, and the in-house management system 150 transmits the vulnerability notification to each of the subordinate processing devices 110. In response to the notification, each of the processing devices 110 executes a process exemplarily illustrated in FIG. 18.

Upon receipt of a vulnerability notification (S200) from a higher-level device (the management system 200 or the in-house management system 150), the processing device 110 identifies a file encrypted by the processing device 110 by using the version of encryption software in which the vulnerability indicated in the notification is found (S202). The document DB 116 in the processing device 110 stores eDoc files generated by the processing device 110 and corresponding metadata, and the metadata of each of the eDoc files is used to identify the encryption software name and version used to generate the corresponding one of the eDocs (see the example structure of metadata illustrated in FIG. 3). In S202, the processing device 110 identifies an eDoc for which the combination of encryption software name and version in the metadata matches the combination given in the vulnerability notification.

Then, the processing device 110 re-encrypts each identified eDoc file by using the current version of encryption software installed therein (S204). In this example, it is assumed that the encryption software of the processing device 110 has been updated appropriately and no vulnerability is discovered in the current version of the encryption software of the processing device 110. In general, vulnerability is likely to be discovered in old versions of encryption software of the processing device 110. If the discovery of vulnerability is reported in the current version of the encryption software of the processing device 110, the processing device 110 downloads the most recent version of the encryption software from a higher-level device or the like and performs re-encryption by using the most recent version. If vulnerability is discovered in the currently used, most recent version of the encryption software, it is expectable that the higher-level device will include a more recent, vulnerability-addressed version of encryption software or include information on the distributor of the software. The re-encryption is performed by, for example, decrypting the target eDoc file by using information on a decryption key recorded in the metadata corresponding to the eDoc file and encrypting the decrypted file by using a newly generated encryption key in accordance with a vulnerability-free version of encryption software. It is assumed that the metadata saved in the processing device 110 includes information on the decryption key in such a manner that, for example, the decryption key has been encrypted by using the public key for the processing device 110. Also, the metadata to be sent to a higher-level device may include the decryption key in such a manner that the decryption key has been encrypted by using the public key for the higher-level device.

The processing device 110 updates the metadata of the eDoc file in accordance with the re-encryption (S206). That is, the processing device 110 rewrites the encoding date and time and the encryption information (the encryption software name, the version information, and the key information) in the metadata (see FIG. 3) into the date and time of the re-encryption, the name and version of the encryption software used for the re-encryption, and information on a decryption key for unlocking the re-encryption. Then, the processing device 110 saves the updated metadata (as, for example, the most recent metadata of the eDoc file) and uploads the metadata to a higher-level device. The higher-level device saves the uploaded updated metadata.

Thereafter, the processing device 110 executes a process for distributing the eDoc file obtained as a result of the re-encryption to each of the destination viewing terminals 104 specified in the destination information in the metadata (S208). That is, for example, the processing device 110 sends a distribution preparation completion notification to each of the destination viewing terminals 104 (see step (7) in FIG. 8). This notification may include, in addition to the DID and the document name, information indicating that the eDoc to be distributed is an update of the previously distributed eDoc. Upon receipt of the distribution preparation completion notification, the viewing terminal 104 overwrites the previous eDoc file before the re-encryption, which is stored therein, with an eDoc file acquired from the processing device 110 when the viewer designates the eDoc for which the distribution preparation completion notification is received as a result of the re-encryption as the target to be viewed on the list screen 500 (see FIG. 11) of the viewing terminal 104. Further, the viewing terminal 104 saves the updated metadata received together with the eDoc file as the most recent metadata of the eDoc. Thus, the eDoc file encrypted with the vulnerable encryption software and the corresponding metadata are no longer present in the viewing terminal 104, and the eDoc file re-encrypted with encryption software in which no vulnerability is found and the corresponding metadata are present instead.

When or before sending a distribution preparation completion notification of a re-encrypted eDoc, the processing device 110 may explicitly transmit a deletion notification including the DID of the eDoc to each of the destination viewing terminals 104. In this case, each of the viewing terminals 104 deletes the existing eDoc file (before the re-encryption) having the DID in accordance with the instruction. At this time, the existing metadata may also be deleted.

Other Example of Designation of Destination Terminal

In the example described above, destination users and viewing terminals 104 selectable by the distributor on the user interface (UI) screen (the input screen 400 illustrated in FIG. 9) of the creation terminal 102 are limited to users and viewing terminals 104 registered in the processing device 110 within the same local system 100 or users and viewing terminals 104 registered in the in-house management system 150 within the same organization (in this case, users and viewing terminals 104 registered in the other processing devices 110 may also be designated as destinations).

In some cases, during a meeting with other organization's personnel (guests), a user in an organization may desire to make a created document, such as a meeting note, temporarily viewable by the guests. In these cases, it is bothersome to register the guests or mobile terminals carried by the guests in the processing device 110 or its higher-level device or to cancel the registration after viewing.

Accordingly, this exemplary embodiment enables distribution of an eDoc to a viewing terminal 104 identified as a terminal carried by a guest (hereinafter referred to as a "guest terminal") under certain restrictions.

For example, a terminal of a user near the creation terminal 102 is identified as a guest terminal, and the guest terminal is added to the list of selectable options in the destination terminal selection menu 406. Alternatively, a terminal of a user near the processing device 110 is identified as a guest terminal, and the guest terminal is added to the list of selectable options in the destination terminal selection menu 406. The creation terminal 102 or the processing device 110 is typically placed in a room in the building of an organization (for example, a room for a department or a meeting room), and a person near the creation terminal 102 or the processing device 110 is expected to be a person who has entered the room with permission to participate in a meeting or the like.

For example, the processing device 110 or the creation terminal 102 searches for partner terminals with which the processing device 110 or the creation terminal 102 is capable of communicating by using short range wireless communication such as Bluetooth Low Energy (registered trademark), and determines that the found partner terminals or terminals among the found partner terminals which are located at a distance less than or equal to a predetermined threshold from the processing device 110 or the creation terminal 102 (in some short range wireless communication, the communication distances to the partner terminals may be determined) are nearby guest terminals. In the destination terminal selection menu 406, the terminal names of the guest terminals detected by the processing device 110 or the creation terminal 102 are displayed as selectable options in a manner different from that of the pre-registered viewing terminals 104 within the organization. The distributor is able to select destination guest terminals from among them.

The processing device 110 or the creation terminal 102 may select only terminals satisfying a predetermined condition among the nearby terminals, rather than all of the nearby terminals, as guest terminals to be added to the list of selectable destinations. Examples of the condition include a condition that the version of a viewer application or any other specific software included in the terminal being examined is greater than or equal to a certain version, and a condition that the terminal being examined is not included in a predetermined terminal rejection list.

A user who carries a guest terminal has not typically been registered in the processing device 110, the local user ID server 152, or the like. Thus, upon receipt of a request for an eDoc file or metadata from a guest terminal designated as a distribution destination of a document, the processing device 110 may distribute the eDoc file and the metadata to the guest terminal without performing user authentication. The metadata of the eDoc to be distributed to the guest terminal incorporates a deletion instruction for deleting the eDoc file and the metadata from the guest terminal when a deletion condition is satisfied. Examples of the deletion condition include the completion of the display of the eDoc on a screen, and the lapse of a predetermined permission period from the time of distribution. At the point in time when the deletion condition is satisfied, the guest terminal deletes the eDoc file and the metadata. This may reduce the risk of leakage of the eDoc by the guest terminal.

Actions Taken in Response to Request from Non-Destination Terminal

The example described above is based on push distribution in which the processing device 110 distributes an eDoc (or a distribution preparation completion notification of the eDoc) to a viewing terminal 104 designated as a destination by the distributor.

Another example may be based on pull distribution in which, in response to a request from the viewing terminal 104, the processing device 110 provides a list of eDocs held by the processing device 110 to the viewing terminal 104 and distributes the eDoc to be viewed that is selected by the user from the list to the viewing terminal 104. In the pull distribution, the destination user may access the processing device 110 from a viewing terminal 104 that is not designated as a destination and may request an eDoc. In response to this request, the processing device 110 may take the following actions.

First Method

Upon receipt of a request from a viewing terminal 104 to distribute an eDoc, the processing device 110 determines whether the viewing terminal 104 is a viewing terminal designated as a destination in the destination information in the most recent metadata of the eDoc. If the viewing terminal 104 is determined not to be a viewing terminal designated as a destination, the processing device 110 does not transmit the file (body) of the eDoc or the metadata to the viewing terminal 104. If the viewing terminal 104 is determined to be a viewing terminal designated as a destination, the processing device 110 may further determine whether the user who has made the distribution request (or the combination of the user and the viewing terminal 104) is included in the destination information in the metadata. If the user is included, the processing device 110 may distribute the eDoc, and if the user is not included, the processing device 110 may not distribute the eDoc.

In the first method, accordingly, the eDoc (the file that is the body and the metadata) is not distributed to a viewing terminal 104 that is not a destination specified by the distributor.

Second Method

In this method, even if a viewing terminal 104 that has sent a request for distributing an eDoc is not a destination viewing terminal 104 specified in the destination information in the metadata of the eDoc, the processing device 110 transmits the file that is the body of the eDoc and the metadata to the viewing terminal 104 so long as the user who has issued the request (i.e., the user who is using the viewing terminal 104) is included as a destination in the destination information. In this case, however, the processing device 110 incorporates flag information indicating that saving is not allowed in the eDoc file and metadata to be transmitted. The viewing terminal 104 displays the eDoc file and metadata including the flag information indicating that saving is not allowed, but does not accept a saving instruction from the user. After the user has completed viewing, the viewing terminal 104 discards the eDoc file and the metadata without saving them.

Instead of the method in which the eDoc file and metadata transmitted to the viewing terminal 104 designated as a destination are not saved in the viewing terminal 104, a method may be conceived in which the eDoc file and the metadata are temporarily saved. In this case, when the viewing terminal 104 is to open the eDoc file again later, the viewing terminal 104 requests the processing device 110 or the like to transmit the most recent metadata of the eDoc (this request is used for requesting permission of viewing). In response to this request, the processing device 110 determines whether the combination of the viewing terminal 104 and the requesting user is included in the destination information in the metadata. If the combination is not included, the processing device 110 sends an instruction to the viewing terminal 104 to delete the eDoc. In accordance with the instruction, the viewing terminal 104 deletes the eDoc file saved therein and the corresponding metadata. The processing device 110 may simply return the most recent metadata in response to the request instead of explicitly sending an instruction to the viewing terminal 104 that has requested the most recent metadata to delete the eDoc. In this case, the viewing terminal 104 may determine whether the received most recent metadata includes the combination of the viewing terminal 104 and the current user. If the combination is not included, the viewing terminal 104 may delete the eDoc file saved therein without opening the eDoc file.

Figure 18:
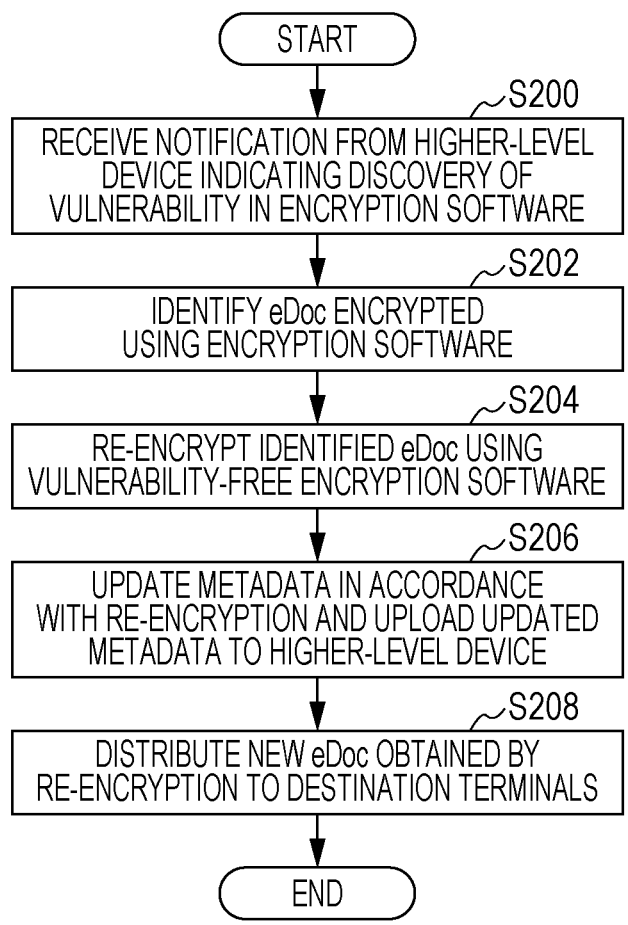
FIG. 18 is a flowchart exemplarily illustrating a process performed by the processing device when vulnerability is found in encryption software.

In the example illustrated in FIG. 18 described above, a re-encrypted eDoc file inherits the DID of the previous eDoc file before the re-encryption. Alternatively, a DID different from that of the previous eDoc file before the re-encryption may be assigned to the re-encrypted eDoc file. In this case, the processing device 110 sends an explicit deletion instruction including the DID of the previous eDoc file before the re-encryption to each of the destination viewing terminals 104 to prevent the previous eDoc file before the re-encryption in which vulnerability is found from being left in the viewing terminal 104. In addition, association information indicating that the re-encrypted eDoc file and the previous eDoc file before the re-encryption correspond to the same document is recorded in the metadata corresponding to the re-encrypted eDoc file or is recorded on the processing device 110 (or a higher-level device, namely, the DID server 220 or the local DID server 154). When the association information is recorded in the metadata corresponding to the re-encrypted eDoc, for example, the DID of the previous eDoc before the re-encryption may be included in the metadata as, for example, a "DID before update" item.

Protected Document Search and Use of Search Results

Next, a search process for information accumulated in the document protection system and a process for updating the protected state of a protected document by using search results will be described.

A document distributed by the document protection system may be searched for by inputting search conditions for the content of the document or the metadata 300 (see FIG. 3) of the document.

The process for generating and distributing an eDoc (a protected document) involves various subjects (users and devices), for example, users, such as a distributor and destination users, and the processing device 110 that has executed a protection process to generate the eDoc from the original document. The term "subject", as used herein, refers to a person or a device involved in an operation on a document, such as a person or a device that has created, edited, processed, or viewed the document. Depending on the purpose of document search, in some cases, a document may be identified by using search conditions for a subject related to the eDoc (i.e., a document that satisfies the search conditions may be searched for).

Since the metadata 300 of the eDoc indicates the attribute information of the eDoc itself, the attribute information of a subject related to the eDoc, such as the processing device 110 or users, is not included in most of the items in the metadata 300 although it may be included in some items. Thus, it is difficult to search for the content of the eDoc or search the metadata 300 by specifying, as desired, search conditions for the attribute information of the subject related to the eDoc.

Accordingly, in this example, the processing device management server 240 or the user ID server 210 is referred to so that an eDoc may be searched for by using search conditions for attribute information items of a subject that are not included in the metadata 300 of the eDoc.

Figure 19:
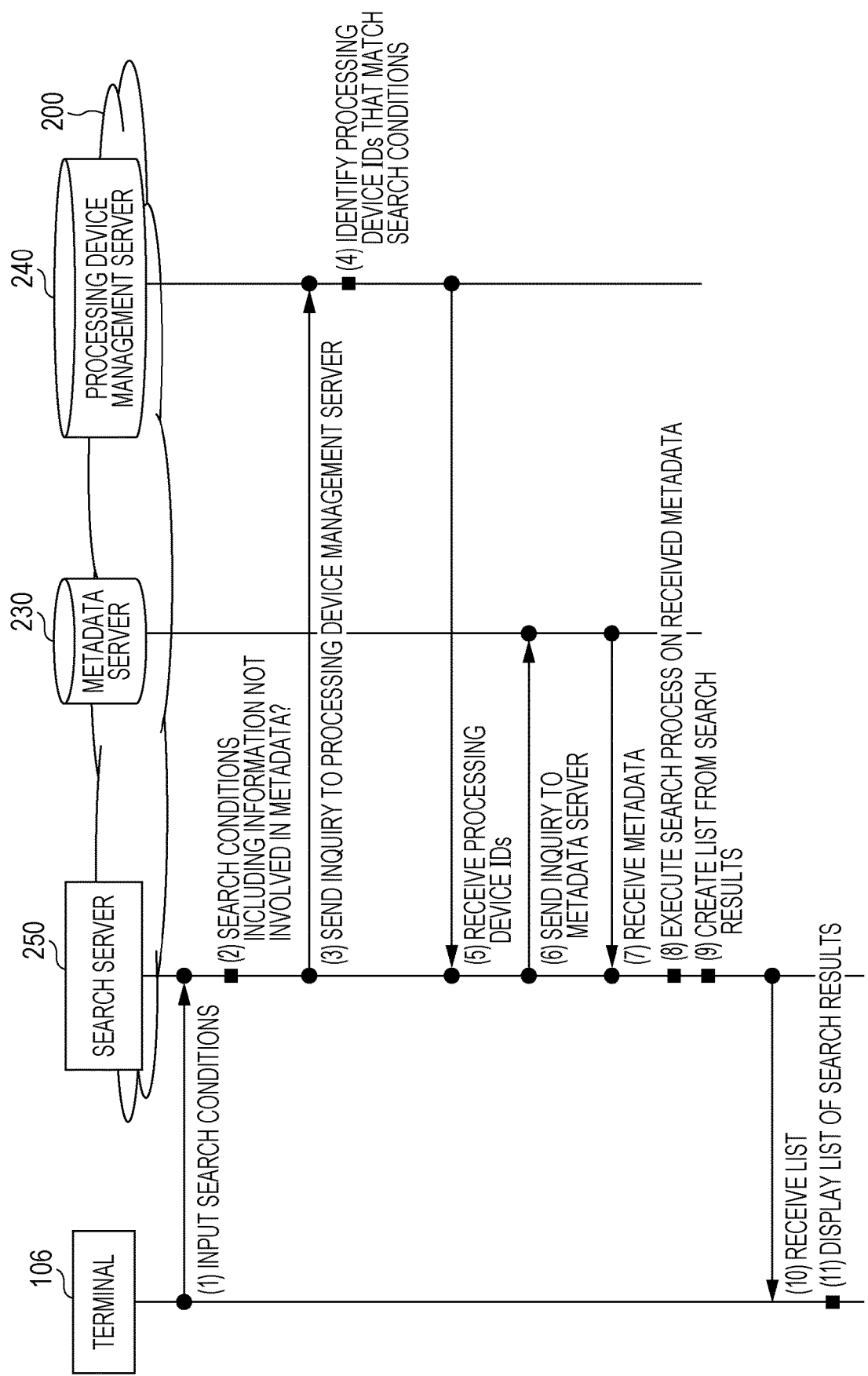
FIG. 19 exemplarily illustrates a flow of protected-document search.
Figure 20:
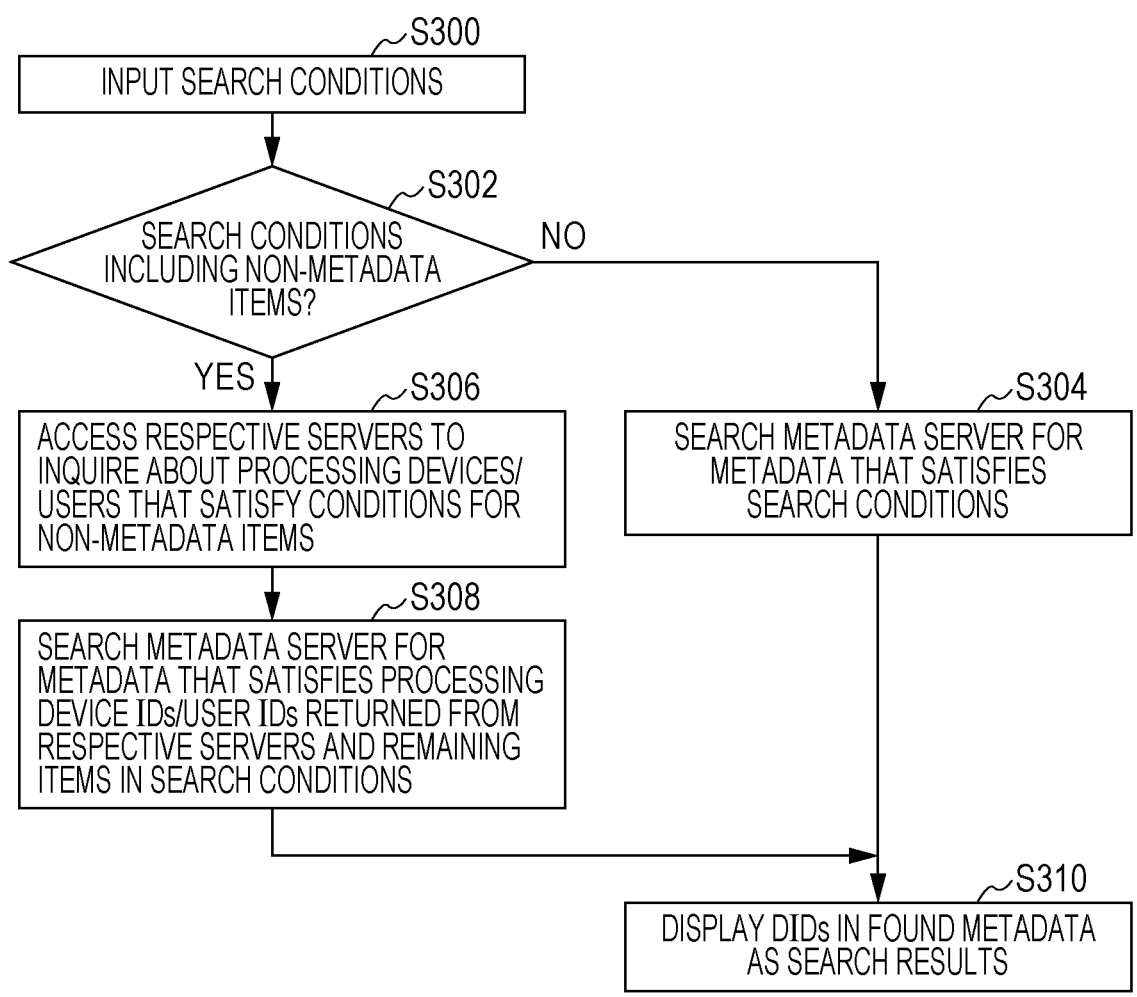
FIG. 20 exemplarily illustrates a processing procedure performed by a search server.

In this example, which is for illustrative purposes only, as illustrated in FIG. 19, the management system 200 further includes a search server 250. The search server 250 provides a user interface screen for inputting search conditions (this screen is referred to as a search screen and may be in web page form, for example) to each terminal 106 capable of accessing the management system 200, and searches the metadata server 230 or the processing device management server 240 by using search conditions input to the screen to find an eDoc that satisfies the search conditions. In FIG. 19, for simplicity of illustration, only the processing device 110 is regarded as a subject related to the eDoc, and only the processing device management server 240 that holds and manages attribute information of each processing device 110 is searched regarding the subject. A flow of document search in the example illustrated in FIG. 19 will be described with reference also to a flowchart illustrated in FIG. 20.

(1) In accordance with an instruction of a user, the terminal 106 accesses the search server 250, acquires a search screen, and displays the search screen. The user inputs search conditions to the search screen (S300). On the search screen, the user is allowed to input search conditions for items in the metadata 300 (see FIG. 3) and items of attribute information of each subject (in the example illustrated in FIG. 19, the status 244 (see FIG. 6) of each of the processing devices 110 managed by the processing device management server 240). For example, conditions for only attribute items of the processing device 110, such as the installation location, for instance, "the fourth floor of Building A", and the encoder circuit firmware version, for instance, "version 2.02 or less", may be accepted as search conditions. Alternatively, a combination of conditions for attribute items of the processing device 110 and conditions for attribute items in the metadata 300, such as keywords or access privilege information, may be accepted as search conditions.

(2) Upon receipt of the search conditions input by the user from the terminal 106, the search server 250 determines whether the search conditions include conditions other than conditions for attribute the items included in metadata, that is, whether the search conditions include conditions for attribute items of a subject such as the processing device 110 (S302).

If the determination result of S302 is No (i.e., if the search conditions do not include conditions other than conditions for metadata, the search server 250 searches for pieces of metadata that satisfy the search conditions from among the pieces of metadata accumulated in the metadata server 230 (S304). The search server 250 provides the DIDs of eDocs corresponding to the pieces of metadata found in S304 that are included in the found pieces of metadata (and bibliographical information (for example, the document names or the distributors) on the eDocs corresponding to the DIDs) to the terminal 106 as search results. The terminal 106 displays the search results (S310). When the search results are displayed, instead of or in addition to the found DIDs, bibliographical information on the protected documents corresponding to the DIDs, such as the document names and distributors, may be displayed.

(3) If the determination result of S302 is Yes, in the example illustrated in FIG. 19, the input search conditions include conditions for attribute items of the processing device 110 (hereinafter referred to as "device conditions"). The search server 250 accesses the processing device management server 240 to inquire about processing devices 110 that satisfy the device conditions (S306). If the input search conditions include conditions for attribute items of a user (hereinafter referred to as "user conditions"), the search server 250 accesses the user ID server 210 to inquire about users who satisfy the user conditions.

(4) Upon receipt of the inquiry, the processing device management server 240 searches the held information (for example, the statuses 244) by using the device conditions to identify processing devices 110 that satisfy the device conditions.

(5) The processing device management server 240 returns a response including information on the processing device IDs of the identified processing devices 110 to the search server 250. The search server 250 receives the response.

The search server 250 searches the metadata server 230 by using conditions including a combination of the processing device IDs returned from the processing device management server 240 and the conditions for the items included in metadata among the input search conditions (S308). Each of the processing device IDs is included in one of the items in the corresponding metadata, and this item indicates the processing device that has generated (i.e., distributed) the eDoc corresponding to the metadata. In FIG. 19, the processing of S308 is constituted by four steps, namely, (6) to (9), by way of example. These four steps are described hereinbelow.

(6) The search server 250 accesses the metadata server 230 to inquire about metadata including the processing device IDs received from the processing device management server 240.

(7) In response to the inquiry, the metadata server 230 searches for metadata including the processing device IDs and returns pieces of metadata obtained as search results to the search server 250. The search server 250 receives the returned pieces of metadata.

(8) The search server 250 searches the received pieces of metadata for pieces of metadata that satisfy conditions for the items included in metadata among the input search conditions.

(9) The search server 250 extracts a predetermined item such as the DID from each of the pieces of metadata obtained as a result of the search to generate a search result list, and transmits the list to the terminal 106.

(10) The terminal 106 receives the search result list.

(11) The terminal 106 displays the received search result list on a screen (S310).

In the search process described above, if the input search conditions include both device conditions and user conditions, the search server 250 accesses the metadata server 230 to inquire about metadata including processing device IDs returned from the processing device management server 240 and also accesses the metadata server 230 to inquire about metadata including user IDs returned from the user ID server 210 as, for example, destination users. Then, the search server 250 combines pieces of metadata obtained as a result of the inquiries in accordance with the combination method (the AND condition or OR condition) of the device conditions and user conditions in the search conditions to form pieces of metadata to be searched. Then, the obtained pieces of metadata are searched for pieces of metadata that satisfy the conditions for the items included in metadata among the input search conditions, and a predetermined item such as the DID is retrieved as a search result from each of the obtained pieces of metadata.

For example, if the input search conditions relate to only device conditions, information in the pieces of metadata returned from the metadata server 230 in step (7) in FIG. 19, such as DIDs, is determined as final search results.

Next, a modification of the flow of the process illustrated in FIG. 19 will be described. In the modification, the processing device management server 240 is searched (step (4) in FIG. 19 and S306 in FIG. 20) for combinations of processing device IDs and periods that satisfy the device conditions.

As exemplarily illustrated in FIG. 6, the processing device management server 240 accumulates not only the most recent status of each of the processing devices 110 but also the status history 242 of each of the processing devices 110, which is a collection of the previous statuses 244 obtained at individual update times. Thus, not only the processing device ID of a processing device 110 having a status 244 that satisfies the device conditions is obtained but the date and time of the status 244 (the date and time when the status of the processing device 110 was updated to the status 244 due to the update of settings or the like) is also obtained from the status history 242. The period from this date and time to the next update date and time of the status of the processing device 110 is a period during which the status found as satisfying the device conditions is valid. In the modification, in step (4) illustrated in FIG. 19, the processing device management server 240 searches for a status 244 that satisfies the device conditions, obtains, as search results, a processing device ID included in a status history 242 including the status 244 and a period from the date and time of the status 244 to the next date and time of the status 244 of the corresponding processing device 110, and returns a response to the search server 250.

Upon receipt of the response, in step (6) in FIG. 19, the search server 250 inquires about metadata corresponding to the combination of the processing device ID and period included in the response. In response to the inquiry, the metadata server 230 searches for metadata that includes the processing device ID and whose encoding date and time (see FIG. 3) is within the period, and returns a search result to the search server 250. The subsequent process may be similar to that exemplarily illustrated in FIG. 19.

This modification may enable search for protected documents generated by processing devices 110 that have statuses at a previous point in time or over a previous period (or enable search for protected documents that further satisfy other conditions among these protected documents).

Next, another modification of the search process will be described with reference to FIG. 21. In the procedure illustrated in FIG. 21, the processing of S300 to S308 is similar to that of the corresponding steps in the procedure illustrated in FIG. 20 and the processing of S312 and subsequent steps is different from that in FIG. 20.

Figure 21:
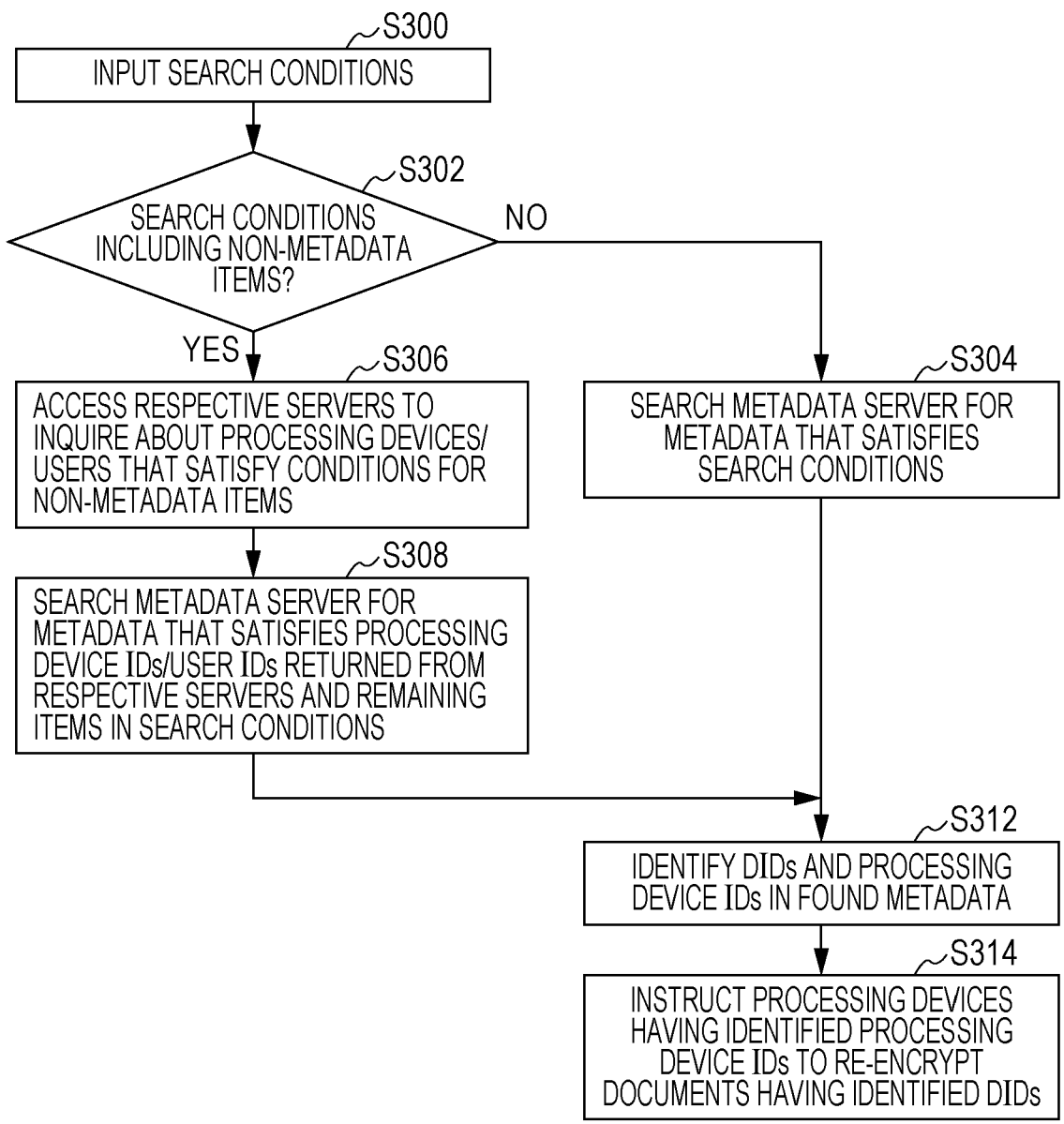
FIG. 21 is another example of the processing procedure performed by the search server.

In the procedure illustrated in FIG. 21, when pieces of metadata that satisfy the search conditions are obtained in S304 or S308, the search server 250 determines combinations of DIDs and processing device IDs included in the respective pieces of metadata (S312). Then, the search server 250 instructs, for each of the determined combinations, the processing device 110 identified by the processing device ID included in the combination to re-encrypt the document having the DID included in the combination (S314). Upon receipt of the instruction, the processing device 110 may perform a process similar to that after S204 in the procedure illustrated in FIG. 18. That is, the processing device 110 decrypts the protected document corresponding to the DID included in the instruction to reproduce the original document (or retrieve the original document saved in association with the DID), and encrypts the original document again by using the most recent encryption software currently installed in the processing device 110 (S204). Then, the processing device 110 updates the metadata (S206) and distributes the new eDoc generated as a result of encryption to each of the destination viewing terminals 104 (S208).

The procedure illustrated in FIG. 21 is used, for example, when vulnerability is discovered in an encryption process in a specific status of the processing device 110, in order to identify the protected document encrypted and generated by the processing device 110 having the status to address vulnerability.

In a specific example, vulnerability is found in encryption performed by the processing device 110 using, for example, an operating system (OS) with version X, encoding software A with version Y, and encryption software B with version Z. The combination of the OS whose version is X, the encoding software whose name is A and whose version is Y, and the encryption software whose name is B and whose version is Z constitutes part of the status of the processing device 110. The administrator of the in-house management system 150 identifies an eDoc encrypted and distributed by the processing device 110 having the status, and determines that the eDoc needs to be re-encrypted and re-distributed under safe conditions. In this case, the administrator inputs search conditions including the combination of the status items of the OS, the encoding software, and the encryption software described above as device conditions to the search server 250. The search server 250 identifies the DID of an eDoc and the ID of a processing device 110 that satisfy the search conditions in accordance with the procedure illustrated in FIG. 21, and instructs the processing device 110 to re-encrypt (and re-distribute) the eDoc.

In the example illustrated in FIG. 21, the processing device 110 re-encrypts an eDoc that satisfies search conditions. A procedure similar to that in FIG. 21 may be used to cause the processing device 110 to execute reprocessing other than re-encryption.

For example, as a result of a consolidation of departments in an organization, a department ceases to exist, and the privilege to access a specific eDoc distributed to users belonging to the department is changed (to, for example, the content of access privilege suitable for a department into which the department has been consolidated). In this case, an eDoc that meets the condition is identified, and the access privilege information (see the metadata 300 illustrated in FIG. 3) set for the eDoc is reset to new content. In this case, the administrator inputs a search condition including the department as a user condition to the search server 250. The search server 250 accesses the user ID server 210 to inquire about users belonging to the department indicated by the user condition included in the search condition. The search server 250 accesses the metadata server 230 to inquire about pieces of metadata including as destination information the user IDs obtained as a result of the inquiry. Then, the search server 250 extracts DIDs and processing device IDs from the pieces of metadata returned from the metadata server 230 in response to the inquiry. Then, the search server 250 instructs each of the processing devices 110 identified by the processing device IDs to update the access privilege information in the metadata corresponding to the DID to predetermined content (the content may be provided by the administrator to the search server 250). Upon receipt of the instruction, the processing device 110 updates the metadata in accordance with the instruction and notifies a higher-level device (the local metadata server 156 or the metadata server 230) of this update.

The procedure illustrated in FIG. 21 may also be used to remove users belonging to a department that ceases to exist from the list of destinations of an eDoc distributed to the users. That is, the search server 250 searches for users belonging to the department in accordance with the search condition (i.e., the department) input from the administrator, and identifies an eDoc distributed to the users found as a result of the search (S312). Then, the search server 250 instructs the processing device 110 that has generated the identified eDoc to delete the users found as a result of the search from the list of destinations of the eDoc, re-generate an eDoc (i.e., re-encrypt the eDoc by using a different encryption key and generate metadata in which the remaining destination users after the deletion of the found users are written in destination information), and re-distribute the eDoc (distribute the eDoc to the remaining destination users). At this time, the search server 250 may instruct the processing device 110 to transmit an indication of deletion of the eDoc (the eDoc before the re-generation) to the users deleted from the destination list.

An exemplary embodiment of the present invention has been described. The devices exemplarily illustrated above, such as the creation terminal 102, the viewing terminal 104, the processing device 110, the local user ID server 152, the local DID server 154, the local metadata server 156, the user ID server 210, the DID server 220, the metadata server 230, and the processing device management server 240, are implemented by causing a computer to execute a program indicating the functions of the devices described above. The computer has a circuit configuration in which hardware components, such as a microprocessor such as a central processing unit (CPU), memory devices (primary storage) such as a random access memory (RAM) and a read-only memory (ROM), a controller that controls fixed storage such as a flash memory, a solid-state drive (SSD), and a hard disk drive (HDD), various input/output (I/O) interfaces, and a network interface that performs control for connection with a network such as a local area network, are connected to one another via a bus, for example. A program describing the processing of the functions of these components is saved in the fixed storage such as the flash memory via a network or the like and is installed into the computer. The program stored in the fixed storage is loaded onto the RAM and is executed by a microprocessor such as the CPU to implement the functional modules exemplified above.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
at least one processor programmed to function as:
an acceptance unit that accepts a search condition for attribute information of a subject;
a determination unit that determines whether or not the search condition for the attribute information is a search condition for attribute items included in metadata,
a first search unit that, when the determined search condition is for attribute items not included in the metadata, searches for subject identification information corresponding to attribute information satisfying the search condition from a first management device that manages subject identification information identifying subjects and attribute information of the subjects in association with each other;
a second search unit that searches for data associated with the subject identification information found by the first search unit from a second management device that manages data and subject identification information identifying subjects related to the data in association with each other,
wherein the subject is a person or device that acted on a document, and the attribute information includes data about the subject that is not included in some items of metadata associated with the document.

2. The information processing apparatus according to claim 1, wherein
the first management device manages, in association with times or time periods, the subject identification information identifying the subjects and the attribute information of the subjects at the times or over the time periods,
the second management device manages, in association with times or time periods,
the data at the times or over the time periods and the subject identification information identifying the subjects related to the data,
the first search unit searches for a time or time period and subject identification information corresponding to the attribute information satisfying the search condition, and
the second search unit searches for data corresponding to the time or time period and the subject identification information found by the first search unit.

3. The information processing apparatus according to claim 2, wherein
the subjects related to the data are processing devices that have performed processing on the data, and
the information processing apparatus further comprises:
a controller that controls a processing device corresponding to the subject identification information associated with the data found by the second search unit among the processing devices to execute reprocessing on the data.

4. The information processing apparatus according to claim 3, wherein
the processing includes encrypting the data by using encryption software, and generating encrypted data, and
the reprocessing includes re-encrypting the data found by the second search unit by using a most recent version of the encryption software.

5. The information processing apparatus according to claim 2, wherein
the subjects related to the data are destination users to which the data is distributed,
the second management device manages, in association with the data, user identification information identifying destination users to which the data is distributed, as the subject identification information identifying the subjects related to the data, and device identification information identifying processing devices that have performed processing on the data, and
the information processing apparatus further comprises:
a controller that controls a processing device corresponding to the device identification information associated with the data found by the second search unit among the processing devices to execute reprocessing on the data.

6. The information processing apparatus according to claim 5, wherein
the processing includes associating metadata with the data, the metadata including a list of pieces of user identification information identifying the destination users to which the data is distributed, and
the reprocessing includes deleting a piece of user identification information identifying a user found by the first search unit from the list included in the metadata associated with the data found by the second search unit.

7. The information processing apparatus according to claim 5, wherein
the processing includes associating metadata with the data, the metadata including information indicating content of an access privilege granted to the destination users for the data, and the reprocessing includes updating the content of the access privilege included in the metadata associated with the data found by the second search unit.

8. The information processing apparatus according to claim 1, wherein the subjects related to the data are processing devices that have performed processing on the data, and the information processing apparatus further comprises:

a controller that controls a processing device corresponding to the subject identification information associated with the data found by the second search unit among the processing devices to execute reprocessing on the data.

9. The information processing apparatus according to claim 8, wherein the processing includes encrypting the data by using encryption software, and generating encrypted data, and the reprocessing includes re-encrypting the data found by the second search unit by using a most recent version of the encryption software.

10. The information processing apparatus according to claim 1, wherein the subjects related to the data are destination users to which the data is distributed, the second management device manages, in association with the data, user identification information identifying destination users to which the data is distributed, as the subject identification information identifying the subjects related to the data, and device identification information identifying processing devices that have performed processing on the data, and the information processing apparatus further comprises:

a controller that controls a processing device corresponding to the device identification information associated with the data found by the second search unit among the processing devices to execute reprocessing on the data.

11. The information processing apparatus according to claim 10, wherein the processing includes associating metadata with the data, the metadata including a list of pieces of user identification information identifying the destination users to which the data is distributed, and the reprocessing includes deleting a piece of user identification information identifying a user found by the first search unit from the list included in the metadata associated with the data found by the second search unit.

12. The information processing apparatus according to claim 10, wherein the processing includes associating metadata with the data, the metadata including information indicating content of an access privilege granted to the destination users for the data, and the reprocessing includes updating the content of the access privilege included in the metadata associated with the data found by the second search unit.

13. A non-transitory computer readable medium storing a program causing a computer to execute a process for information processing, the process comprising:

accepting a search condition for attribute information of a subject;

determining whether or not the search condition for the attribute information is a search condition for attribute items included in metadata, when the search condition is for attribute items not included in the metadata, searching for subject identification information corresponding to attribute information satisfying the search condition from a first management device that manages subject identification information identifying subjects and attribute information of the subjects in association with each other;

searching for data associated with the subject identification information found by the first search unit from a second management device that manages data and subject identification information identifying subjects related to the data in association with each other, wherein the subject is a person or device that acted on a document, and the attribute information includes data about the subject that is not included in some items of metadata associated with the document.

* * * * *